United States Patent
Cincon et al.

(10) Patent No.: US 12,373,674 B2
(45) Date of Patent: Jul. 29, 2025

(54) CODING OF AN EVENT IN AN ANALOG DATA FLOW WITH A FIRST EVENT DETECTION SPIKE AND A SECOND DELAYED SPIKE

(71) Applicant: STMicroelectronics France, Montrouge (FR)

(72) Inventors: Valerian Cincon, Villard Bonnot (FR); Philippe Galy, Le Touvet (FR)

(73) Assignee: STMicroelectronics France, Montrouge (FR)

( * ) Notice: Subject to any disclaimer, the term of this patent is extended or adjusted under 35 U.S.C. 154(b) by 972 days.

(21) Appl. No.: 17/347,374

(22) Filed: Jun. 14, 2021

(65) Prior Publication Data
US 2021/0390374 A1 Dec. 16, 2021

(30) Foreign Application Priority Data
Jun. 16, 2020 (FR) .................................. 2006279

(51) Int. Cl.
| | | |
|---|---|---|
| *G06N 3/049* | (2023.01) | |
| *G06N 3/065* | (2023.01) | |
| *G06N 3/08* | (2023.01) | |
| G06N 20/10 | (2019.01) | |
| G06V 20/40 | (2022.01) | |
| G10L 15/16 | (2006.01) | |

(52) U.S. Cl.
CPC ............. *G06N 3/049* (2013.01); *G06N 3/065* (2023.01); *G06N 3/08* (2013.01); G06N 20/10 (2019.01); G06V 20/40 (2022.01); G10L 15/16 (2013.01)

(58) Field of Classification Search
CPC .......... G06N 3/065; G06N 3/049; G06N 3/08
See application file for complete search history.

(56) References Cited

U.S. PATENT DOCUMENTS

| | | | |
|---|---|---|---|
| 8,975,935 B1* | 3/2015 | Yung ..................... | G06N 3/065 |
| | | | 327/263 |
| 2013/0204820 A1* | 8/2013 | Hunzinger ............. | G06N 3/049 |
| | | | 706/25 |
| 2015/0193680 A1* | 7/2015 | Chan ....................... | G06N 3/08 |
| | | | 706/20 |

(Continued)

FOREIGN PATENT DOCUMENTS

WO WO-2015034441 A1 * 3/2015 ......... A61B 5/04001

OTHER PUBLICATIONS

Hwu, Tiffany et al. "Adaptive Robot Path Planning Using a Spiking Neuron Algorithm With Axonal Delays". Jun. 2018. IEEE Transactions on Cognitive and Developmental Systems. vol. 10 No 2. pp. 126-137 (Year: 2018).*

(Continued)

*Primary Examiner* — David Yi
*Assistant Examiner* — Ezra J Baker
(74) *Attorney, Agent, or Firm* — Seed IP Law Group LLP

(57) ABSTRACT

A method includes generating, by a first spiking neuron, an event detection signal indicating a time of detection of an event in a data flow. The event detection signal is transmitted from the first spiking neuron to a second spiking neuron. The second spiking neuron generates a spike delayed, with respect to the time of detection of the event, according to an amplitude of the event. The delayed spike is included in a coded signal.

20 Claims, 13 Drawing Sheets

(56) References Cited

U.S. PATENT DOCUMENTS

| | | | |
|---|---|---|---|
| 2015/0220829 A1* | 8/2015 | Hunzinger | G06N 3/049 706/17 |
| 2018/0121802 A1* | 5/2018 | Ruckauer | G06N 3/049 |
| 2018/0174039 A1* | 6/2018 | Davies | G06N 3/08 |
| 2019/0042910 A1* | 2/2019 | Krishnamurthy | G06N 3/049 |
| 2019/0115011 A1* | 4/2019 | Khellah | G10L 15/02 |

OTHER PUBLICATIONS

March, Gabriel Reines. "Musical instrument identification system based on neurally inspired sound onset modelling". Jul. 10, 2013. Universitat Politàcnica de Catalunya. (Year: 2013).*

Zhao, Chenyuan. "Spike Processing Circuit Design for Neuromorphic Computing". Aug. 8, 2019. Virginia Polytechnic Institute and State University. (Year: 2019).*

Zhao, Chenyuan et al. "Spike-Time-Dependent Encoding for Neuromorphic Processors". Sep. 2015. ACM Journal on Emerging Technologies in Computing Systems. vol. 12, No. 3, Article 23. pp. 23:1-23:21 (Year: 2015).*

Shin, Jonghan et al.; "Adaptations in spiking neurons based on the noise shaping neural coding hypothesis"; 2001 (Year: 2001).*

Zhao, Chenyuan et al.; "Analog Spike-Timing-Dependent Resistive Crossbar Design for Brain Inspired Computing"; Mar. 2018; IEEE Journal on Emerging and Selected Topics in Circuits and Systems; vol. 8 No. 1 (Year: 2018).*

Yan, Bonan; "Highly Efficient Neuromorphic Computing Systems With Emerging Nonvolatile Memories"; 2020; Duke University (Year: 2020).*

Gerstner, Wulfram; "Spiking Neurons"; 1998; Pulsed Neural Networks; 1-54 (Year: 1998).*

Ambrogio, S et al; "Spike-timing dependent plasticity in a transistor-selected resistive switching memory"; 2013; IOP Publishing Nanotechnology 24; 1-9 (Year: 2013).*

Choudhary, Saket Kumar et al.; "Spiking Activity of a LIF Neuron in Distributed Delay Framework"; 2016; International Journal of Interactive Multimedia and Artificial Intelligence vol. 3 N7; 70-76 (Year: 2016).*

Kawanishi, Koya et al; "Reduce the Computing Time for SpikeProp by Approximation of Spike Response Function"; 2016; Procedia Computer Science 96; 1186-1192 (Year: 2016).*

Bernert et al. "An Attention-Based Spiking Neural Network for Unsupervised Spike-Sorting." *International Journal of Neural Systems* 29(08):1850059, 2019, 19 pages.

Bernert et al. "Fully unsupervised online spike sorting based on an artificial spiking neural network," *bioRxiv 236224*: 2017, 29 pages.

Brasselet et al. "Neurons with Stereotyped and Rapid Responses Provide a Reference Frame for Relative Temporal Coding in Primate Auditory Cortex." *The Journal of Neuroscience* 32(9):2098-3008, 2012.

Cao et al., "Spiking Deep Convolutional Neural Networks for Energy-Efficient Object Recognition," *Int J Comput Vis 113*:54-66, 2015.

Caporale et al. "Spike Timing-Dependent Plasticity: A Hebbian Learning Rule." *Annual Review of Neuroscience* 31(1):25-46, 2012.

Dan et al. "Spike Timing-Dependent Plasticity: From Synapse to Perception." *Physiol Rev 86*:1033-1048, 2008.

DeAngelis et al. "Receptive field dynamics in the central visual pathways." *Trends Neuroscience 18*:451-458, 1995.

Deng "The MNIST Database of Handwritten Digit Images for Machine Learning Research [Best of the Web]." *IEEE Signal Processing Magazine* 29(6):141-142, 2012.

Diehl et al. "Unsupervised learning of digit recognition using spike-timing-dependent plasticity." *Frontiers in Computational Neuroscience* 9(99): 2015, 9 pages.

Hao et al. "A biologically plausible supervised learning method for spiking neural networks using the symmetric STDP rule." *Neural Networks 121*:387-395, 2020.

Izhikevich et al. "Spike-timing Dynamics of Neuronal Groups." *Cerebral Cortex* 14(8):933-944, 2004.

Izhikevich "Polychronization: Computation with Spikes." *Neural Computation* 18(2):245-282, 2006.

Kaller et al. "Myelin plasticity and behaviour-connecting the dots." *Current Opinion in Neurobiology 47*:86-92, 2006.

Kheradpisheh et al. "STDP-based spiking deep convolutional neural networks for object recognition." *Neural Networks 99*:56-67, 2018.

Kumar et al. "Spiking activity propagation in neuronal networks: Reconciling different perspectives on neural coding." *Nature Reviews Neuroscience 11*:615-627, 2010.

Lee et al. "Training Deep Spiking Neural Networks Using Backpropagation." *Frontiers in Neuroscience* 10(508): 2010, 13 pages.

Leijnen et al. "The Neural Network Zoo." *Proceedings 47*(9): 2020, 6 pages.

Lindeberg, "Time-Causal and Time-Recursive Spatio-Temporal Receptive Fields." *J Math Imaging Vis 55*:50-88, 2016.

Luczak et al., "Packet-based communication in the cortex." *Nature Reviews Neuroscience 16*:745-755, 2015.

Maass, Networks of Spiking Neurons: The Third Generation of Neural Network Models. *Neural Networks* 10(9):1659-1671, 1997.

Maass, "On the Computational Power of Winner-Take-All." *Neural Computation* 12(11):2519-2535, 2000.

Mostafa, "Supervised Learning Based on Temporal Coding in Spiking Neural Networks." *IEEE Transactions on Neural Networks and Learning Systems* 29(7):3227-3235, 2018.

Mozafari et al., "Bio-inspired digit recognition using reward-modulated spike-timing-dependent plasticity in deep convolutional networks." *Pattern Recognition 94*:87-95, 2019.

Neftci et al., "Event-Driven Random Back-Propagation: Enabling Neuromorphic Deep Learning Machines." *Frontiers in Neuroscience* 11(324): 2017, 18 pages.

Neftci et al., "Surrogate Gradient Learning in Spiking Neural Networks." *ArXiv:1901.09948v2*, 2019, 25 pages.

Pignatelli et al., Role of Dopamine Neurons in Reward and Aversion: A Synaptic Plasticity Perspective, *Neuron 86*:1145-1157, 2015.

Rueckauer et al., "Conversion of analog to spiking neural networks using sparse temporal coding." IEEE International Symposium on Circuits and Systems (ISCAS), May 27-30, 2018, Florence, Italy, 2018, 5 pages.

Rueckauer et al., "Conversion of Continuous-Valued Deep Networks to Efficient Event-Driven Networks for Image Classification." *Frontiers in Neuroscience* 11(682): 2017, 12 pages.

Rullen et al., "Rate Coding Versus Temporal Order Coding: What the Retinal Ganglion Cells Tell the Visual Cortex." *Neural Computation* 13(6):1255-1283, 2001.

Schmidhuber, "Deep learning in neural networks: An overview." *Neural Networks 61*:85-117, 2015.

Shi et al., "A Curiosity-Based Learning Method for Spiking Neural Networks." *Frontiers in Computational Neuroscience* 14(7): 2020, 12 pages.

Shlens et al., "Synchronized firing in the retina." *Current Opinion in Neurobiology* 18(4):396-402, 2008.

Tavanaei et al., "A Spiking Network that Learns to Extract Spike Signatures from Speech Signals." *Neurocomputing 240*:191-199, 2017.

Tavanaei et al., "Training Spiking ConvNets by STDP and Gradient Descent." International Joint Conference on Neural Networks (IJCNN), Jul. 8-13, 2018, Rio de Janeiro, Brazil, 8 pages.

Tavanaei et al., "Deep learning in spiking neural networks." *Neural Networks 111*:47-63, 2019.

Thiele et al., "Event-Based, Timescale Invariant Unsupervised Online Deep Learning With STDP." *Frontiers in Computational Neuroscience* 12(46): 2018, 13 pages.

Wade et al., "SWAT: A Spiking Neural Network Training Algorithm for Classification Problems." *IEEE Transactions on Neural Networks* 21(11):1817-1830, 2010.

Warland et al., "Decoding Visual Information From a Population of Retinal Ganglion Cells." *Journal of Neurophysiology* 78(5):2336-2350, 1997.

(56) References Cited

OTHER PUBLICATIONS

Wu et al., "A Biologically Plausible Speech Recognition Framework Based on Spiking Neural Networks." International Joint Conference on Neural Networks (IJCNN), Jul. 8-13, 2018, Rio de Janeiro, Brazil, 8 pages.

Wu et al., "Deep Spiking Neural Network with Spike Count based Learning Rule." International Joint Conference on Neural Networks (IJCNN), Jul. 14-19, 2019, Budapest, Hungary, 6 pages.

Zhang et al., "A Digital Liquid State Machine With Biologically Inspired Learning and Its Application to Speech Recognition." *IEEE Transactions on Neural Networks and Learning Systems* 26(11):2635-2649, 2015.

Dong et al., "Unsupervised speech recognition through spike-timing-dependent plasticity in a convolutional spiking neural network," *PLOS ONE* downloaded from https://journals.plos.org/plosone/article?id=10.1371/journal.pone.0204596, 19 pages, 2018.

Park et al., "T2FSNN: Deep Spiking Neural Networks with Time-to-first-spike Coding," *arXiv:2003.11741v1*, 2020, 6 pages.

Zhang et al., "TDSNN: From Deep Neural Networks to Deep Spike Neural Networks with Temporal-Coding," *AAAI-19, IAAI-19, EAAI-20* 33(1):1319-1326, 2019.

\* cited by examiner

CODING OF AN EVENT IN AN ANALOG DATA FLOW WITH A FIRST EVENT DETECTION SPIKE AND A SECOND DELAYED SPIKE

BACKGROUND

Technical Field

The present disclosure generally concerns electronic devices and, more particularly, devices using spiking neurons to code data.

Description of the Related Art

Spiking neurons are capable of coding data flows, for example, video or audio flows. Such neurons for example implement rate coding methods. Rate coding methods typically comprise periodically emitting spikes. The spikes are more particularly emitted at a variable frequency, such a frequency being for example generated according to an amplitude of an event of the data flow which is desired to be coded.

Rate coding methods however do not enable to precisely indicate a time of occurrence of an event. Further, the implementation of rate coding methods generally causes a significant power consumption.

BRIEF SUMMARY

An embodiment provides a data flow coding method comprising:
  the receiving, by a first spiking neuron, of the data flow;
  the transmitting, from the first spiking neuron to a second spiking neuron, of an event detection signal indicating a time of detection of an event of the data flow; and
  the generation, by means of the second spiking neuron, of a coded signal, the coded signal comprising a spike delayed, with respect to the time of detection of the event, according to an amplitude of the event.
An embodiment provides a system comprising:
  a coding unit such as described; and
  a neural network, intended to process coded signals originating from the coding unit.

In an embodiment, a method comprises storing, by a neuron of a neural network, spike pattern data originating from the coding of an event, the spike pattern data comprising a set:
  of first parameters, indicating the presence of spikes on synapses of the neuron; and
  of second parameters, indicating a timing of the spikes.

In an embodiment, a method comprises: generating, by a first spiking neuron, an event detection signal indicating a time of detection of an event in a data flow; transmitting, from the first spiking neuron to a second spiking neuron, the event detection signal; and generating, by the second spiking neuron, of a spike delayed, with respect to the time of detection of the event, according to an amplitude of the event, the delayed spike being included in a coded signal.

In an embodiment, a device comprises: a first spiking neuron, which, in operation, generates an event detection signal indicating a time of detection of an event in a data flow; and a second spiking neuron coupled to the first spiking neuron, wherein the second spiking neuron, in operation, generates a spike delayed, with respect to the time of detection of the event, according to an amplitude of the event, and the delayed spike is included in a coded signal.

In an embodiment, a system comprises: an encoder including: a first spiking neuron, which, in operation, generates a spike indicating a time of detection of an event in a data flow; and a second spiking neuron coupled to the first spiking neuron, wherein the second spiking neuron, in operation, generates a spike delayed, with respect to the time of detection of the event, according to an amplitude of the event, wherein the encoder, in operation, generates a coded signal including the spike indicating detection of the event and the delayed spike; and a neural network coupled to the encoder, wherein the neural network, in operation, processes coded signals generated by the encoder.

In an embodiment, a method comprises: storing, on a set of storage neurons of a neural network, a set of spike pattern data, the storing the set of spike pattern data including: storing first parameters indicative of a presence of spikes on a respective neuron of the set of storage neurons; and storing, on the set of storage neurons of the neural network, second parameters indicative of a timing of spikes on the respective neuron of the set of storage neurons.

In an embodiment, a neural network comprises: a timing neuron, which, in operation, generates a signal indicative of an attention period; and a set of storage neurons coupled to the timing neuron, wherein the set of storage neurons, in operation, store a set of spike pattern data, the set of spike pattern data including: first parameters indicative of a presence of spikes on a respective neuron of the set of storage neurons during the attention period; and second parameters indicative of a timing of spikes on the respective neuron of the set of storage neurons.

In an embodiment, a system comprises: an encoder, which, in operation, generates encoded data based on a data flow, the encoder including a plurality of sets of pairs of spiking neurons, each pair including: a first spiking neuron, which, in operation, generates a spike indicating a time of detection of an event in the data flow; and a second spiking neuron coupled to the first spiking neuron, wherein the second spiking neuron, in operation, generates a spike delayed, with respect to the time of detection of the event, according to an amplitude of the event; and a neural network coupled to the encoder, wherein the neural network, in operation, processes coded signals generated by the encoder, and the neural network includes: a timing neuron, which, in operation, generates a signal indicative of an attention period; and a set of storage neurons coupled to the timing neuron, wherein the set of storage neurons, in operation, store a set of spike pattern data based on the encoded data.

BRIEF DESCRIPTION OF THE SEVERAL VIEWS OF THE DRAWINGS

The foregoing and other features and advantages of the present disclosure will be discussed in detail in the following non-limiting description of specific embodiments and implementation modes in connection with the accompanying drawings, in which.

DETAILED DESCRIPTION

Figure 1:
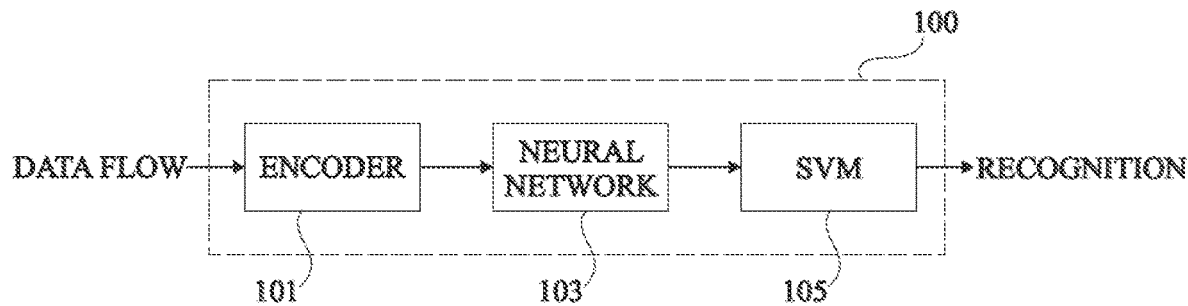
FIG. 1 schematically shows in the form of blocks an example of a data flow processing system.

Like features have been designated by like references in the various figures unless the context indicates otherwise. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the processing of the data flows after coding is not detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, within 5%; etc.

Figure 13:
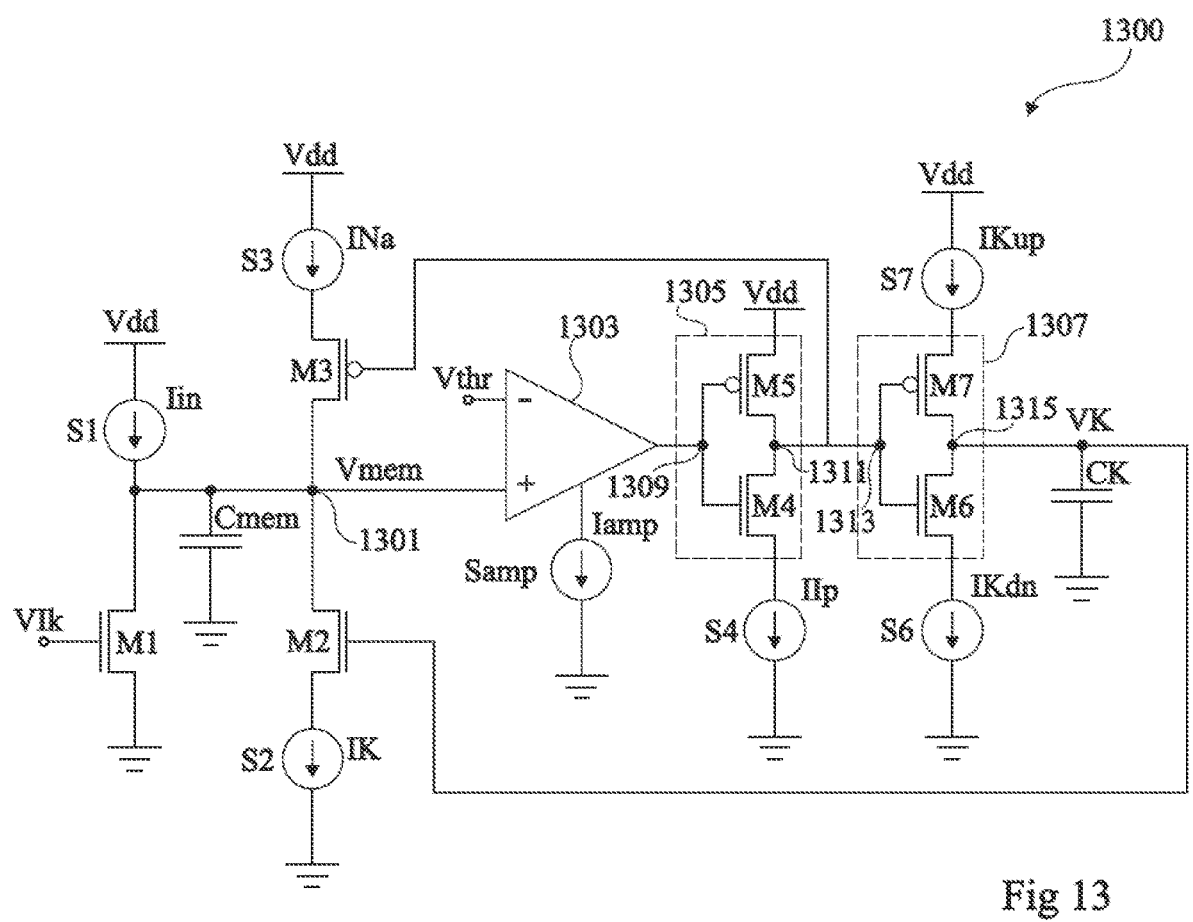
FIG. 13 is an example of a circuit of implementation of a spiking neuron.

FIG. 13 is an example of a circuit 1300 of implementation of a spiking neuron, for example, similar to the circuit described in chapter 7 of the book "Event-Based Neuromorphic Systems" (ISBN: 9780470018491).

In the shown example, circuit 1300 comprises a current source S1 connected between a node of application of a potential Vdd, for example corresponding to a power supply voltage of neuron 1300, and another node 1301. Source S1 is for example configured to supply an electric current Iin.

A potential Vmem is present at node 1301. Potential Vmem for example corresponds to an input signal, for example, a membrane voltage, of neuron 1300.

As illustrated in FIG. 13, circuit 1300 comprises a capacitor Cmem. Capacitor Cmem is for example connected between node 1301 and a node of application of a reference potential, for example, the ground.

In the shown example, circuit 1300 comprises transistors M1, M2, and M3. Transistors M1, M2, and M3 are for example MOS (Metal-Oxide-Semiconductor) transistors. More particularly, in the shown example, transistors M1 and M2 are N-type MOS transistors, or NMOS transistors, while transistor M3 is a P-type MOS transistor, or PMOS transistor.

In the shown example:
transistor M1 is connected between node 1301 and the node of application of the reference potential;
transistor M2 is connected between node 1301 and a terminal of a current source S2, the other terminal of source S2 being connected to the node of application of the reference potential; and
transistor M3 is connected between node 1301 and a terminal of a current source S3, the other terminal of source S3 being connected to the node of application of potential Vdd.

More particularly, in the example of FIG. 13:
transistor M1 has its drain connected to node 1301 and its source connected to the node of application of the reference potential;
transistor M2 has its drain connected to node 1301 and its source coupled, via current source S2, to the node of application of the reference potential; and
transistor M3 has its drain coupled, via current source S3, to the node of application of potential Vdd and its source connected to node 1301.

Current sources S2 and S3 for example respectively supply electric currents IK and INa.

In the shown example, circuit 1300 comprises an operational amplifier 1303 having its non-inverting input (+) receiving potential Vmem. A potential Vthr is for example applied to the inverting input (−) of operational amplifier 1303. Potential Vthr for example corresponds to a turn-on threshold of neuron 1300. Operational amplifier 1303 is for example powered by a current source Samp, connected between operational amplifier 1303 and the node of application of the reference potential. Current source Samp for example supplies an electric current Tamp.

In the shown example, circuit 1300 comprises two inverting logic gates 1305 and 1307, or inverters. In this example, logic gate 1305 comprises an input node 1309, connected to the output of operational amplifier 1303, and an output node 1311, connected to the gate of transistor M3. Logic gate 1307 comprises an input node 1313, connected to the output node 1311 of logic gate 1305, and an output node 1315, connected to the gate of transistor M2.

As an example, inverting logic gate 1305 more particularly comprises:
a transistor M4, for example, an NMOS transistor, having its drain connected to the output node 1311 of gate 1305 and having its source coupled, via a current source S4, to the node of application of the reference potential; and a transistor M5, for example, a PMOS transistor, having its drain connected to the node of application of potential Vdd and having its source connected to the output node 1309 of gate 1305.

Similarly, inverting logic gate 1307 for example more particularly comprises:

a transistor M6, for example, an NMOS transistor, having its drain connected to the output node 1315 of gate 1307 and having its source coupled, via a current source S6, to the node of application of the reference potential; and a transistor M7, for example, a PMOS transistor, having its drain coupled, via a current source S7, to the node of application of potential Vdd and having its source connected to the output node 1315 of gate 1307.

Current sources S4, S6, and S7 for example respectively supply electric currents IIp, IKdn, and IKup.

In the shown example:

the gate of transistor M1 receives on its gate a potential VIk;

the gate of transistor M2 is controlled by a potential VK present at the output node 1315 of gate 1307;

the gate of transistor M3 is controlled by the output node 1311 of gate 1305;

the respective gates of transistors M4 and M5 of gate 1305 are controlled by the output of operational amplifier 1303; and the respective gates of transistors M6 and M7 of gate 1307 are controlled by the output 1311 of gate 1305.

In the shown example, circuit 1300 comprises another capacitor CK. Capacitor CK is for example connected between the output node 1315 of gate 1307 and the node of application of the reference potential.

Figure 14:
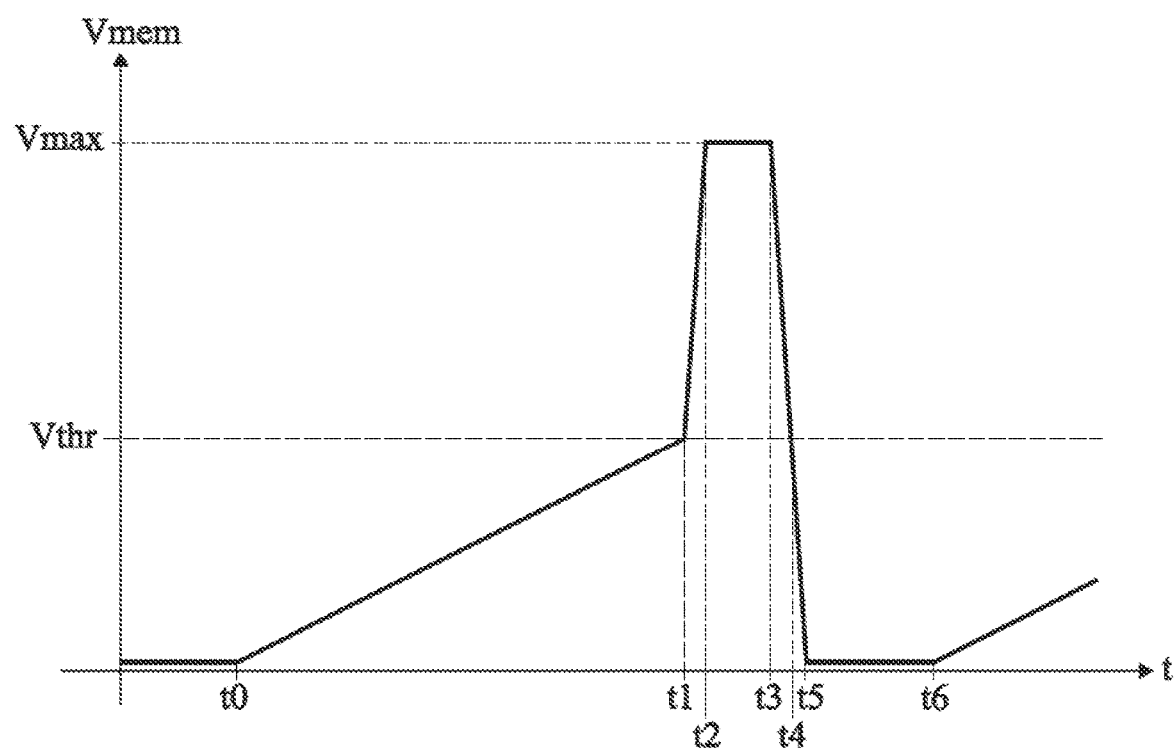
FIG. 14 is an example of a timing diagram illustrating the operation of the circuit of FIG. 13.

FIG. 14 is an example of timing diagram illustrating the operation of the circuit 1300 of FIG. 13. The timing diagram of FIG. 14 more particularly illustrates the variation over time t (in abscissas), of the potential Vmem present at node 1301 of circuit 1300.

It is initially assumed, at a time to, that the potential Vmem of node 1301 is substantially zero and lower than the turn-on threshold Vthr of neuron 1300. The output of operational amplifier 1303 then for example applies a negative voltage −Vsat to the input node 1309 of inverting logic gate 1305. In this case, transistor M4 is off while transistor M5 is on. This results in taking the output node 1311 of gate 1305, and thus the gate of PMOS transistor M3, to a potential substantially equal to potential Vdd. Transistor M3 is then turned off.

Still at time t0, the input node 1313 of gate 1307 is taken to a potential substantially equal to potential Vdd. In this case, transistor M6 is on while transistor M7 is off. This results in taking the output node 1315 of gate 1307, and thus the gate of NMOS transistor M2, to the reference potential, that is, the ground in the present example. Transistor M2 is then turned off.

At time t0, it is assumed that capacitors Cmem and CK are empty, and that transistor M1 is off. Source S1 supplies current Iin, which results in starting charging capacitor Cmem. In other words, an integration by capacitor Cmem of the current Iin supplied by source S1 is started at time t0. The value of the potential Vmem present at node 1301 then increases as capacitor Cmem charges.

At a time t1 subsequent to time t0, the value of the potential Vmem present at node 1301 exceeds the turn-on threshold Vthr of neuron 1300. This then causes a switching of the output of operational amplifier 1303 from negative voltage −Vsat to a positive voltage +Vsat.

This results in turning on transistors M4 and M7, while transistors M5 and M6 turn off. The potential of node 1311 is thus drawn to ground. Transistor M3 then becomes conductive. From time t1, capacitor Cmem is then charged not only by source S1, supplying current Iin, but also by source S3, supplying current INa. The charge of capacitor Cmem and voltage Vmem then starts increasing more rapidly than between times t0 and t1.

At time t1, capacitor CK starts charging due to the current IKup supplied by source S7. This results in progressively increasing the potential VK present at the output node 1315 of inverter 1307.

At a time t2 subsequent to time t1, potential Vmem reaches a maximum value Vmax. The maximum value Vmax reached by potential Vmem at time t1 is for example conditioned by potential Vdd.

From time t2, potential Vmem remains substantially constant and equal to Vmax until a time t3 subsequent to time t2.

It is assumed, at time t3, that potential VK reaches a value sufficient to switch transistor M2 from the off state to the on state. The duration separating time t2 from time t3 is for example conditioned by the value of capacitor CK and by the value of the current IKup supplied by source S7.

Assuming that the current IK conveyed by source S2 is greater than the sum of the currents tin and INa respectively supplied by sources S1 and S3, capacitor Cmem starts discharging at time t3. This then causes a decrease in the potential Vmem present at node 1301.

At a time t4 subsequent to time t3, the value of potential Vmem becomes smaller than the turn-on threshold Vthr of neuron 1300. This for example causes a switching of the output of operational amplifier 1303 from positive voltage +Vsat to negative voltage −Vsat.

This results in turning on transistors M5 and M6, while transistors M4 and M7 turn off. The potential of the output node 1311 of inverter 1305 is thus taken to a value substantially equal to potential Vdd. Transistor M3 is then turned off, which stops the supply of current INa by source S3.

Still at time t4, source S6 starts conveying current IKdn. This results in starting the discharge of capacitor CK and in decreasing the potential VK of the output node 1315 of inverter 1307.

At a time t5 subsequent to time t4, it is assumed that potential Vmem reaches a value substantially equal to the reference potential.

In the shown example, the variation of potential Vmem between times t1 and t5 corresponds to the generation, by neuron 1300, of a spike having a duration equal to t3−t2.

From time t5, potential Vmem remains substantially constant and equal to the reference potential until a time t6 subsequent to time t5.

The period separating time t5 from time t6 is called refractory period of neuron 1300. During this period, potential VK is sufficiently significant to prevent the switching of transistor M2 from the on state to the off state. Thus, whatever the membrane potential Vmem of neuron 1300 during the refractory period, neuron 1300 emits no spike.

At time t6, it is assumed that potential VK reaches a sufficiently low value to switch transistor M2 from the on state to the off state. The duration separating time t5 from time t6 is for example conditioned by the value of capacitor CK and by the value of the current IKdn conveyed by source S6.

In the example previously described in relation with FIGS. 13 and 14, capacitors Cmem and CK may be formed, in practice, by discrete components. As a variant, capacitors Cmem and CK may be formed by stray capacitances of circuit 1300, for example, gate capacitors of transistors M2 and M6, respectively.

FIG. 1 schematically shows in the form of blocks an example of a data flow processing system 100.

In the shown example, data flow processing system 100 comprises coding circuitry 101 (ENCODER). The encoder 101 of system 100 receives a data flow (DATA FLOW) as an input. As an example, the data flow corresponds to an audio flow or to a video flow. More generally, the data flow received by encoder 101 is for example a time-variable analog signal. Encoder 101 enables in this case to code the analog signal, for example, to allow a subsequent processing of the signal by one or a plurality of digital processing circuits.

In the following description, it is considered for simplification that the data flow received by encoder 101 is a voltage signal having a time-variable amplitude.

In the example, data flow processing system 100 further comprises an artificial neural network 103. After the coding by encoder 101, neural network 103 receives a coded signal which is an image of the data flow at the input of the encoder 101. Neural network 103 is for example capable of processing the coded signal transmitted by encoder 101. In practice, neural network 103 for example comprises an input layer, receiving the signal transmitted by encoder 101, one or a plurality of so-called hidden layers, enabling to process the signal, and an output layer, generating a signal originating from the processing by the hidden layer(s). As an example, neural network 103 enables to implement image recognition functions, in the case where the data flow received by system 100 is a video flow, or vocal recognition functions, in the case where the data flow is an audio flow.

Neural network 103 may be a classification network. As a variant, as in the shown example, system 100 comprises circuitry to process the output of the neural network 103, as illustrated a support vector machine (SVM) 105, different from neural network 103. As an example, SVM 105 facilitates indicating a recognition or a lack of recognition of a score supplied by neural network 103, for example, by implementing a machine learning algorithm.

In FIG. 1, a system 100 comprising a support vector machine 105 separated from neural network 103 has been symbolized. However, in practice, the functions of support vector machine 105 and those of neural network 103 may be performed by a same element.

The encoder 101 of data flow processing system 100 delivers input data having the result of the processing performed by neural network 103 depending thereon.

Figure 2:
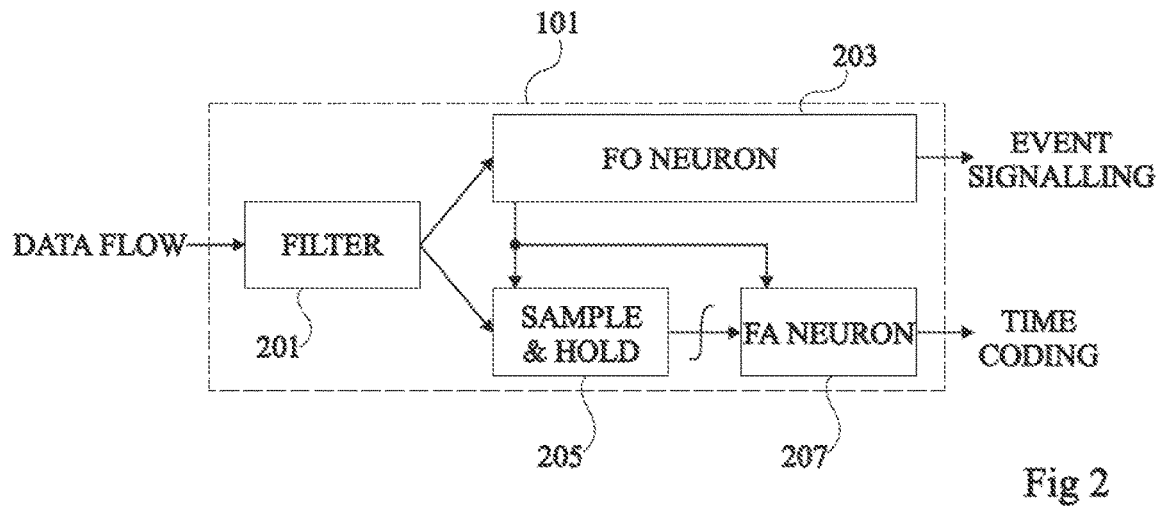
FIG. 2 schematically shows in the form of blocks an embodiment of a data flow coding unit.

FIG. 2 schematically shows in the form of blocks an embodiment of data flow coding circuitry, for example, the encoder 101 of the system 100 of FIG. 1.

In the shown example, encoder 101 comprises a filter 201. Filter 201 receives as an input the data flow to be coded and outputs a filtered signal. Generally, filter 201 is configured to keep events of interest, and to remove events of the data flow which are for example not desired to be taken into account for the coding and the processing.

As a variant, filter 201 is omitted. In this case, all the events of the data flow are for example taken into account for the coding.

In the shown example, encoder 101 comprises a neuron 203 (FO NEURON). Neuron 203 is for example a spiking neuron. Spiking neuron 203 receives as an input the filtered signal originating from the output of filter 201. In the considered example where filter 201 receives as an input a voltage signal, the output signal of filter 201 is for example another voltage signal. This other voltage signal is for example used to excite a membrane of neuron 203.

Spiking neuron 203 generates at its output an event detection signal (EVENT SIGNALLING) marking a time of detection of an event of the data flow.

In the shown example, encoder 101 comprises a sample-and-hold circuit 205 (SAMPLE & HOLD). Sample-and-hold circuit 205 receives as an input the output signal of filter 201. Sample-and-hold circuit 205 is controlled by an output signal of neuron 203. Sample-and-hold circuit 205 for example enables, on order of neuron 203, to store a value of the output signal of filter 201, and to output a substantially constant voltage signal equal to this value.

In the shown example, encoder 101 comprises another neuron 207 (FA NEURON). Neuron 207 is for example a spiking neuron. Spiking neuron 207 receives as an input the output signal of sample-and-hold circuit 205 and is controlled by the output signal of neuron 203. As an example, on order of neuron 203, neuron 207 integrates the output signal of sample-and-hold circuit 205.

Spiking neuron 207 generates at its output a spike signal (TIME CODING) which is an image of an amplitude of the event of the data flow detected by spiking neuron 203.

The elements of FIG. 2 are for example implemented by analog circuits. Various types of neurons may be used to form neurons 203 and 207, for example, neurons such as that implemented by the circuit 1300 described in relation with FIGS. 13 and 14.

The elements of FIG. 2 may as a variant be implemented by an analog circuit in combination with one or a plurality of digital components. In this case, the signals of the analog circuit are for example converted by an analog-to-digital converter to allow their processing by the digital component(s).

The elements of FIG. 2 may as a variant be implemented at least partially in software form, as will now be described with reference to FIG. 3.

Figure 3:
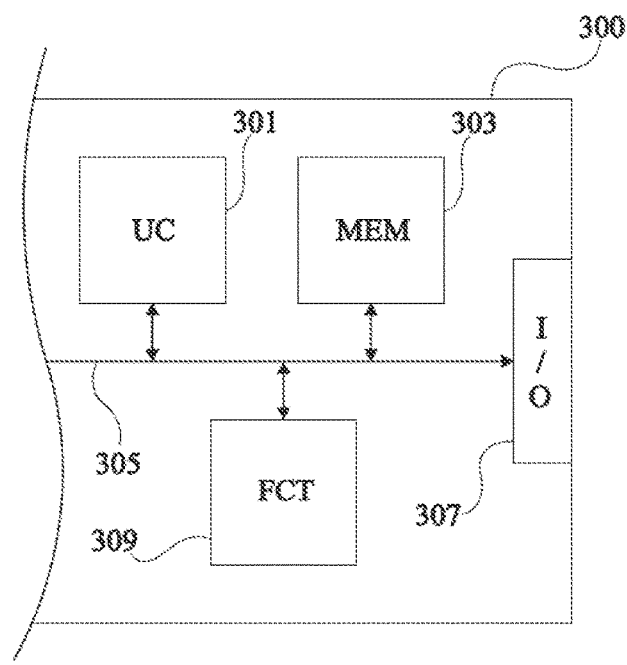
FIG. 3 schematically shows in the form of blocks an example of an electronic circuit capable of implementing, as an example, the coding unit of FIG. 2.

FIG. 3 schematically shows in the form of blocks an example of an electronic circuit 300 capable of implementing the encoder 101 of FIG. 2.

In the shown example, circuit 300 comprises:
- a calculation entity 301 (UC), for example, a state machine, a microprocessor, a programmable logic circuit, etc.;
- one or a plurality of volatile and/or non-volatile storage areas 303 (MEM);
- one or a plurality of data, address, and/or control buses 305 between the different elements internal to circuit 300; and
- an input-output interface 307 (I/O) for communicating with the outside of circuit 300.

Circuit 300 may comprise various other circuits according to the application, symbolized in FIG. 3 by a block or circuit 309 (FCT).

Filter 201, spiking neurons 203 and 207, and sample-and-hold unit 205 may be formed by circuit 300. For example, circuit 300 receives, via input-output interface 307, a digital flow generated by an analog-to digital converter, and this flow is stored in memory 303 before being processed by calculation entity 301.

Figure 4:
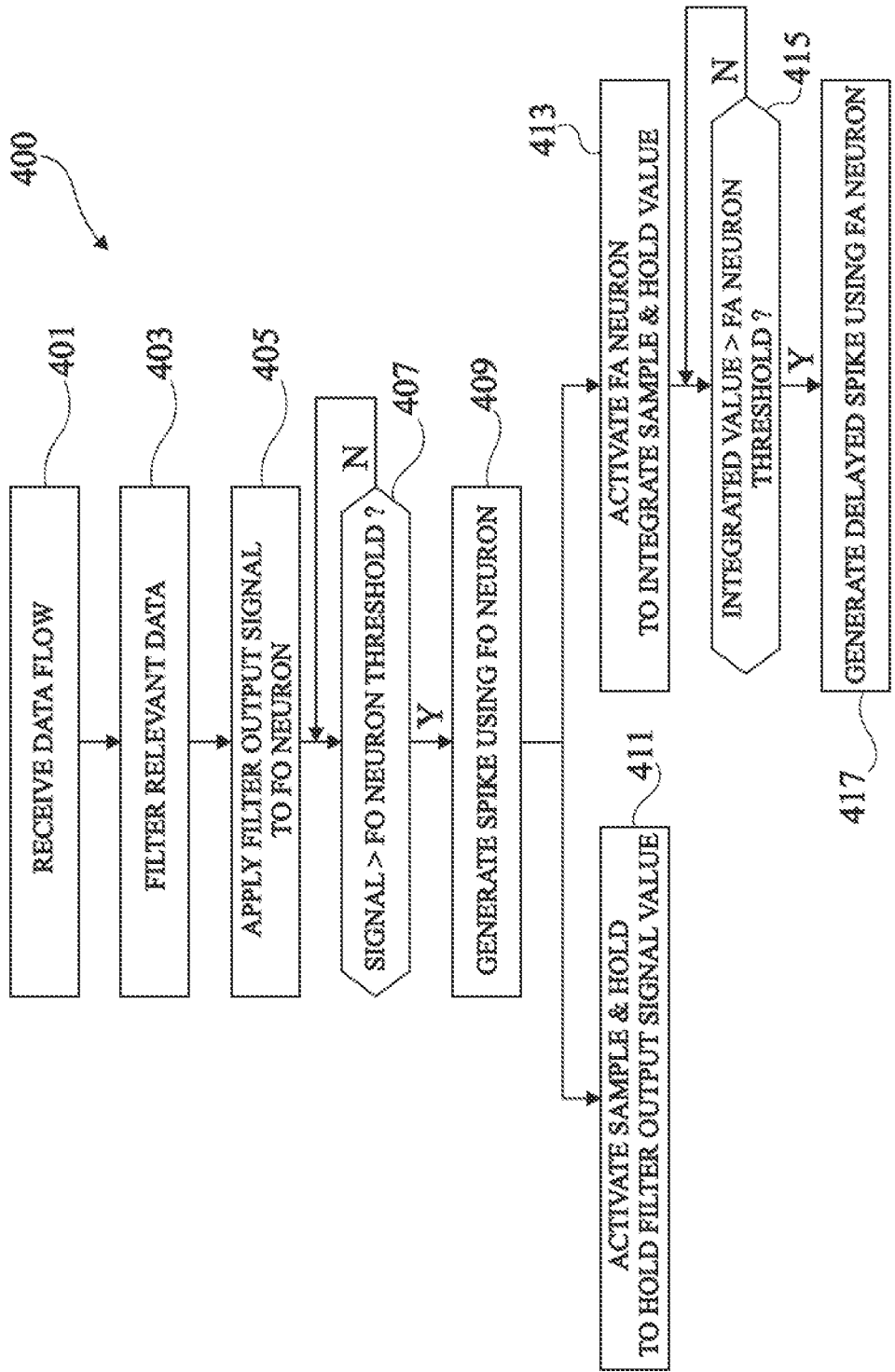
FIG. 4 schematically shows in the form of blocks an example implementation mode of a data flow coding method.
Figure 5:
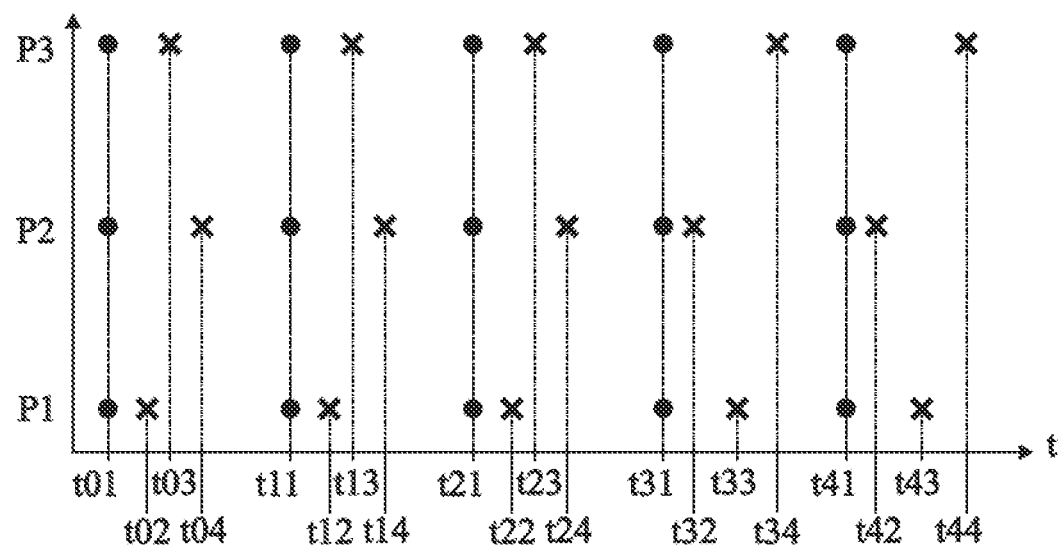
FIG. 5 is a timing diagram illustrating an example of application, by the coding unit of FIG. 2, of the method of FIG. 4.

Example operation of encoder 101, and particularly of the neurons 203 and 207 of FIG. 2, is described hereafter in relation with FIGS. 4 and 5.

FIG. 4 schematically shows in the form of blocks an embodiment of a data flow coding method 400. Method 400 is for example implemented by the encoder 101 of FIG. 2.

According to this implementation mode, during an operation 401 (RECEIVE DATA FLOW), encoder 101 receives the data flow to be coded.

During another operation 403 (FILTER RELEVANT DATA), the data flow received by encoder 101 is filtered by filter 201. Filter 201 then outputs the filtered signal used for the coding of the data flow.

During still another operation 405 (APPLY FILTER OUTPUT SIGNAL TO FO NEURON), the signal filtered by filter 201 is transmitted to neuron 203. More particularly, during operation 405, the output signal of filter 201 is for example used to excite the membrane of neuron 203.

Although this is not shown in FIG. 4, the output signal of filter 201 is transmitted to sample-and-hold unit 205.

During still another operation 407 (SIGNAL>FO NEURON THRESHOLD?), the membrane voltage of neuron 203 is compared with a turn-on threshold TH1 of neuron 203. In practice, it is for example verified whether the membrane voltage of neuron 203 exceeds threshold TH1, in the case of a digital implementation, or a comparator such as the operational amplifier 1303 of FIG. 13 is for example used to compare the membrane voltage of neuron 203 with threshold TH1 (Vthr in FIG. 13), in the case of an analog implementation. As long as the membrane voltage of neuron 203 does not exceed threshold TH1 (output N), this verification is carried on along the variation of the signal applied to the membrane of neuron 203.

When, at operation 407, the membrane voltage of neuron 203 exceeds the turn-on threshold value of neuron 203 (output Y), a spike is generated by neuron 203 during still another operation 409 (GENERATE SPIKE USING FO NEURON). Once the spike has been generated by neuron 203, the neuron enters a refractory period similar to that previously described in relation with FIG. 14. During the refractory period, the generation of spikes by neuron 203 is for example inhibited whatever the value of the voltage applied to the membrane of neuron 203.

The generation of the spike by neuron 203 during operation 409 for example simultaneously causes an activation of sample-and-hold unit 205, during an operation 411 (ACTIVATE SAMPLE & HOLD TO HOLD FILTER OUTPUT SIGNAL VALUE), and an activation of neuron 207, during another operation 413 (ACTIVATE FA NEURON TO INTEGRATE SAMPLE & HOLD VALUE). In a case where neuron 207 is similar to the neuron 1300 of FIG. 13, neuron 207 is for example activated by turning off transistor M2. More specifically:

during operation 411, neuron 203 for example controls circuit 205 to store the value of the output voltage of filter 201, that is, the membrane voltage of neuron 203, at the time of the generation of the spike by neuron 203; and during operation 413, neuron 207 is activated at the time of the generation of the spike by neuron 203 and starts integrating the signal originating from the output of unit 205, that is, the output value of filter 201 such as stored by unit 205 during the generation of the spike by neuron 203.

During still another operation 415 (INTEGRATED VALUE>FA NEURON THRESHOLD?), the membrane voltage of neuron 207 is compared with a turn-on threshold TH2 of neuron 207. In practice, it is for example verified whether the membrane voltage of neuron 207 exceeds threshold TH2, in the case of a digital implementation, or a comparator, such as the operational amplifier 1303 of FIG. 13, is for example used to compare the membrane voltage of neuron 207 with threshold TH2 (Vthr in FIG. 13), in the case of an analog implementation. As long as the membrane voltage of neuron 207 does not exceed threshold TH2 (output N), the verification is carried on along the variation of the signal applied to the membrane of neuron 207.

When, at time 415, the membrane voltage of neuron 207 exceeds the value of the turn-on threshold of neuron 207 (output Y), a spike is generated, by neuron 207, during still another operation 417 (GENERATE DELAYED SPIKE USING FA NEURON). In this example, the higher the output value of filter 201 during the emission of a spike by neuron 203, the shorter the duration of integration by neuron 207. Indeed, the integration of a high signal, for example, by a capacitor, will cause a faster exceeding of the threshold than the integration of a low signal. Once the spike has been generated by neuron 207, the neuron enters a refractory period similar to that previously described for neuron 203.

As an example, method 400 is carried on by returning to step 403 once the durations of inhibition of neurons 203 and 207 have both elapsed.

The method 400 disclosed in relation with FIG. 4 allows, from a data flow, the generation:

by neuron 203, of a spike indicating a time of occurrence of an event; and by neuron 205, of another spike having, with respect to the spike generated by neuron 203, a time shift which is a function of the amplitude of the event.

FIG. 5 is a timing diagram illustrating an example of application, by the encoder 101 of FIG. 2, of the method 400 of FIG. 4. The timing diagram of FIG. 5 more particularly illustrates an example of signals generated by three pairs P1, P2, and P3 of neurons. Each pair P1, P2, P3 of neurons for example forms part of an encoder similar to encoder 101, and comprises in this example neuron 203 and neuron 207. Each encoder comprising a pair P1, P2, P3 of neurons for example receives a portion of the data flow, for example, a signal acquired by a sound channel in the case of an audio flow.

In the example of FIG. 5, the spikes generated by the neurons 203 of pairs P1, P2, and P3 are symbolized by dots, while the spikes generated by the neurons 207 of pairs P1, P2, and P3 are symbolized by crosses. In the rest of the disclosure, it is assumed for simplification that the neurons 203 of pairs P1, P2, and P3 have turn-on threshold voltages identical to one another and that the neurons 207 of pairs P1, P2, and P3 have turn-on threshold voltages identical to one another, to within manufacturing dispersions.

In the shown example, at a time t01, the neurons 203 of pairs P1, P2, and P3 each emit a spike. This is for example due to the fact that the neurons 203 of pairs P1, P2, and P3, assumed to initially be outside of the refractory period, are simultaneously each excited by a membrane voltage greater than their turn-on threshold voltage.

Time t01 marks the beginning of the integration, by the neurons 207 of pairs P1, P2, and P3, of the membrane voltage of the neurons 203 which are respectively associated therewith. It is arbitrarily assumed, in this example, that the membrane voltage of the neuron 203 of pair P1 is, at time t01, greater than the membrane voltage of the neuron 203 of pair P3. It is further assumed, still in the present example, that the membrane voltage of the neuron 203 of pair P3 is, at time t01, greater than the membrane voltage of the neuron 203 of pair P2.

In the shown example, the integral of the membrane voltage of the neuron 203 of pair P1 exceeds the value of the turn-on threshold of the neuron 207 of pair P1 at a time t02 subsequent to time t01. At time t02, the neuron 207 of pair P1 generates a spike representative of the amplitude of the membrane voltage of the neuron 203 of pair P1, which is itself a function of the amplitude of the input signal of the unit comprising pair P1.

Similarly, in the shown example, the integral of the membrane voltage of the neuron 203 of pair P3 exceeds the value of the turn-on threshold of the neuron 207 of pair P3 at a time t03 subsequent to time t02. At time t03, the neuron 207 of pair P3 generates a spike representative of the amplitude of the membrane voltage of the neuron 203 of pair P3, which is itself a function of the amplitude of the input signal of the unit comprising pair P3.

In the shown example, the integral of the membrane voltage of the neuron 203 of pair P2 exceeds the value of the turn-on threshold of the neuron 207 of pair P2 at a time t04 subsequent to time t03. At time t04, the neuron 207 of pair P2 generates a spike representative of the amplitude of the membrane of the neuron 203 of pair P2, which is itself a function of the amplitude of the input signal of the unit comprising pair P2.

The spikes generated at times t01, t02, t03 and t04 together form what will be called herein a "spike pattern" representative of the input data flow.

It is assumed that, at a time t11 subsequent to time t04, the respective input signals of the encoders comprising pairs P1, P2, and P3 of neurons have the same amplitude as at time t01. The neurons 203 of pairs P1, P2, and P3 then emit a spike at time t11, after which the neurons 207 of pairs P1, P3, and P2 alternately emit a spike at successive times t12, t13, and t14. Times t12, t13, and t14 are for example similar, respectively, to the previously-described times t02, t03, and t04.

Similarly, it is assumed that, at a time t21 subsequent to time t14, the respective input signals of the encoders or coding units comprising pairs P1, P2, and P3 of neurons have the same amplitude as at time t01. The neurons 203 of pairs P1, P2, and P3 then each emit a spike at time t21, after which the neurons 207 of pairs P1, P3, and P2 alternately emit a spike at successive times t22, t23, and t24. Times t22, t23, and t24 are for example similar, respectively, to the previously-described times t02, t03, and t04.

In the shown example, it is assumed that the respective input signals of the coding units comprising pairs P1, P2, and P3 of neurons vary between time t24 and a time t31 subsequent to time t24. More particularly, it is arbitrarily assumed that at time t31, the membrane voltage of the neuron 203 of pair P2 is greater than the membrane voltage of the neuron 203 of pair P1. It is assumed that the membrane voltage of the neuron 203 of pair P1 is, at time t31, greater than the membrane voltage of the neuron 203 of pair P3.

The neurons 203 of pairs P1, P2, and P3 each emit a spike at time t31. Time t31 marks the beginning of the integration, by the neurons 207 of pairs P1, P2, and P3, of the membrane voltage of the neurons 203 which are respectively associated therewith.

In the shown example, the integrals of the membrane voltages of the neurons 203 of pairs P2, P1, and P3 respectively exceed the values of the turn-on threshold of the neurons 207 associated with successive times t32, t33, and t34 subsequent to time t31. The neurons 207 of pairs P2, P1, P3 alternately generate a spike at times t32, t33, t34.

The spikes generated at times t31, t32, t33 and t34 together form another spike pattern representative of the modified input data flow.

Figure 6:
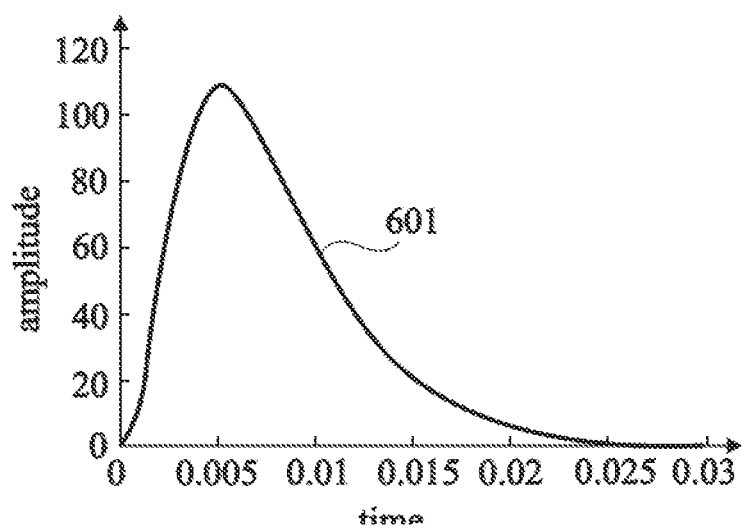
FIG. 6 is a graph illustrating an example of a curve of impulse response of a filter.

FIG. 6 is a graph illustrating an example of a curve 601 of an impulse response of a filter, for example, the filter 201 of the coding unit 101 of FIG. 2. The graph of FIG. 6 more particularly illustrates an example of the time variation of an amplitude of an output signal of filter 201 during the application of a spike on the input of filter 201. The output signal of filter 201 is for example a voltage signal used to excite the membrane of the neuron 203 of coding unit 101.

The graph of FIG. 6 particularly illustrates an example where filter 201 is a low-pass filter. In this case, filter 201 is for example intended to eliminate events of the data flow which have a frequency of occurrence higher than a frequency threshold, to keep events having a frequency of occurrence smaller than this threshold. This amounts to eliminating events of the data flow which have a duration of occurrence shorter than a duration threshold, to keep events having a duration of occurrence longer than this threshold. As an example, this enables not to take into account fleeting events capable of adversely affecting the subsequent processing of the data flow.

In this case, filter 201 for example comprises a capacitor and a resistor coupled or connected in series between an input terminal of filter 201, for example, corresponding to an input terminal of coding unit 101, and an output terminal of filter 201.

Figure 7:
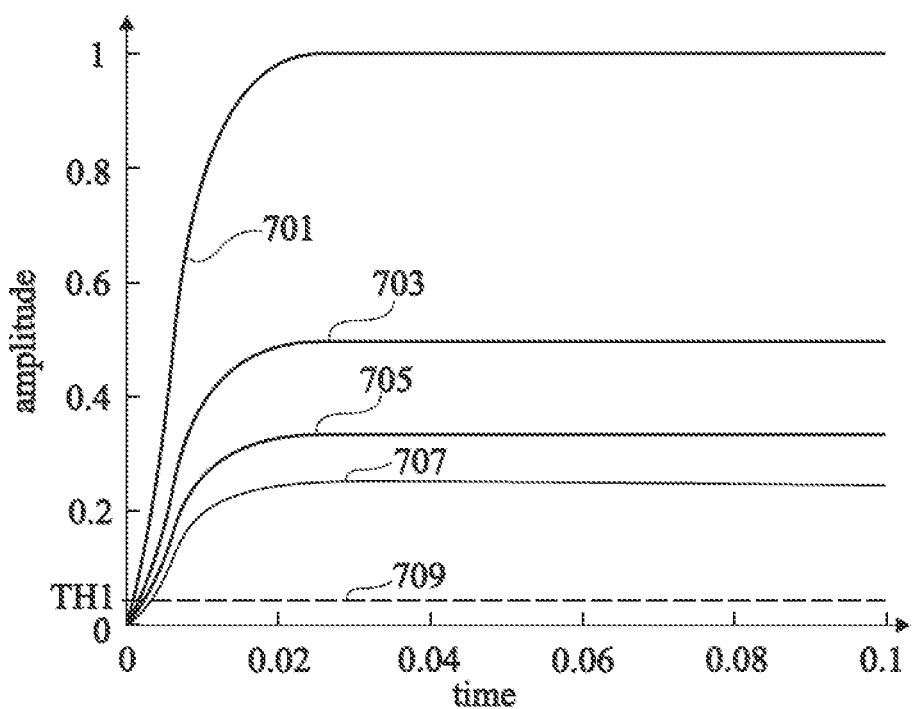
FIG. 7 is a graph illustrating examples of signals associated with the operation of the coding unit of FIG. 2.

FIG. 7 is a graph illustrating examples of signals associated with the operation of the coding unit 101 of FIG. 2. The graph of FIG. 7 more particularly illustrates, with curves 701, 703, 705, and 707, examples of the time variation of an amplitude of an output signal of filter 201. In this example, it is assumed that filter 201 is a low-pass filter as discussed in relation with FIG. 6.

Curves 701, 703, 705, and 707 for example correspond to the output signals of filter 201 obtained by applying, to the input of filter 201, step-type signals having different amplitudes. In the shown example, curves 703, 705, and 707 more particularly illustrate examples of output signals of filter 201 obtained by applying amplitude steps respectively equal to half, to one third of, and to one quarter of the amplitude of the step applied to obtain curve 701.

In practice, the output signals 701, 703, 705, and 707 of filter 201 may be used to excite the membrane of the neuron 203 of coding unit 101. In FIG. 7, a horizontal dotted line 709 symbolizes the turn-on threshold TH1 of neuron 203.

In the shown example, curves 701, 703, 705, and 707 intersect line 709 at different points. This particularly means that the time of emission of a spike by neuron 203, conditioned by the time of crossing of threshold TH1, varies according to the amplitude of the signal having caused a starting of neuron 203. As a result, the time of starting of the integration, by neuron 207, of the membrane voltage of neuron 203 and the amplitude of this voltage are correlated. This is likely to adversely affect the coding of a data flow, for example, in the case of a system comprising a plurality of coding units 101 where phase shifts may occur between neurons 203 of the system.

To synchronize the spikes emitted by a system comprising a plurality of neurons 203, each associated with a neuron 207, the spike generated by one of the neurons 203 of the system may for example be used:

to temporarily decrease the thresholds TH1 of the other neurons 203 of the system which have not emitted a spike yet, to anticipate the turning on of the neurons; or to decrease the refractory periods of the other neurons 203 of the system, to reset the neurons if they are delayed with respect to the neuron 203 having its spike used for the synchronization.

As a variant, the synchronization of neurons 203 is for example achieved by using the spike generated by one of the neurons 203 of the system to impose an additional refractory period to the other neurons 203 of the system, to wait for all neurons 203 to be in a state enabling them to emit a spike.

Figure 8:
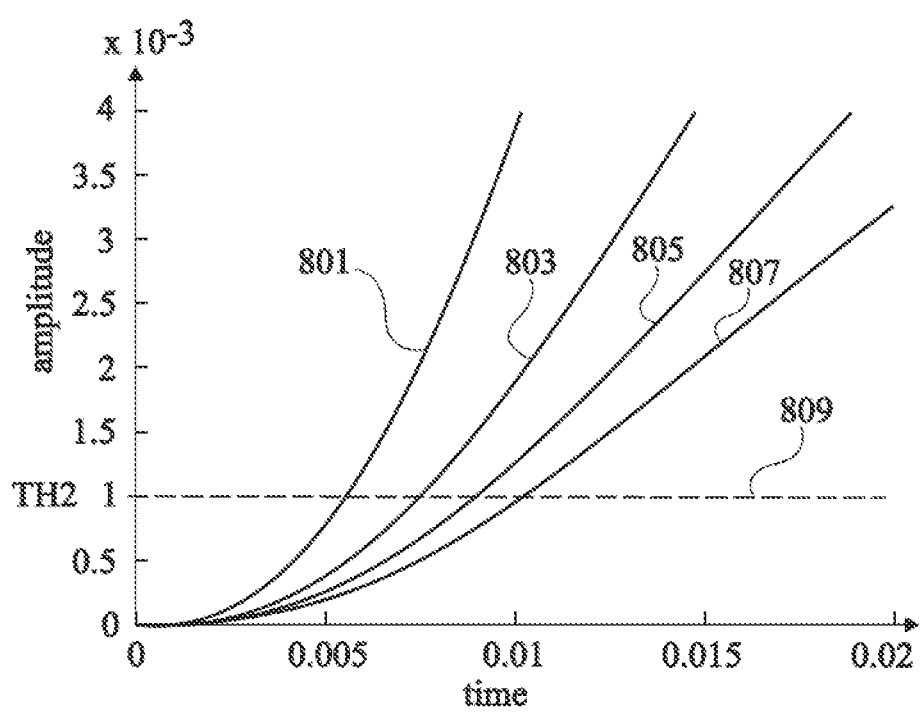
FIG. 8 is a graph illustrating examples of other signals associated with the operation of the coding unit of FIG. 2.

FIG. 8 is a graph illustrating examples of other signals associated with the operation of the coding unit 101 of FIG. 2. The graph of FIG. 8 more particularly illustrates, with curves, 801, 803, 805, and 807, examples of the time variation of an amplitude of the membrane voltage of neuron 207.

In the shown example, curves 801, 803, 805, and 807 more particularly illustrate examples of signals obtained during the integration, by neuron 207, of the membrane voltage of neuron 203, such as illustrated for example by curves 701, 703, 705, and 707 of FIG. 7. In the shown example, curves 803, 805, and 807 are obtained by applying, to the input of filter 201, voltage steps having amplitudes respectively equal to half, to one third of, and to one quarter of the amplitude of the voltage step applied to obtain curve 801.

In FIG. 8, a horizontal dotted line 809 symbolizes the turn-on threshold TH2 of neuron 207. In the shown example, curves 801, 803, 805, and 807, intersect line 809 at different points. In the shown example, the higher the amplitude of the input signal, the shorter the delay of crossing of threshold TH2. More particularly, in the shown example, the delay of crossing of threshold TH2 is inversely proportional to the amplitude of the input signal. This for example corresponds to a case where neuron 207 linearly integrates the membrane voltage of neuron 203. A non-uniform coding is then obtained.

It is sometimes desirable, for certain applications, to come down to a uniform coding, that is, a coding for which the delay of crossing of threshold TH2 is directly proportional to the amplitude of the input signal. Neuron 207 may then for example be configured to non-linearly integrate the membrane voltage of neuron 203. As an example, each value x of the membrane voltage of neuron 203 may in particular be matched with a value y of the crossing delay of threshold TH2 obtained by applying the following equation:

$$y = axe^{bx(x+k)} + cxc^{dx(x+h)} + f \quad \text{[Math 1]}$$

In above expression Math 1, letters a, b, c, d, f, h, and k represent constants, for example:
a=1.75E−2;
b=3.185;
c=1.5E−15;
d=16;
f=7.7E−2;
h=1.087; and
k=2E−2.

Generally, it will be within the abilities of those skilled in the art to determine the value of each constant a, b, c, d, f, h, and k according to the application.

In practice, the transformation corresponding to relation Math 1 may for example be applied by software. As a variant, the transformation corresponding to relation Math 1 is applied by hardware, for example, a circuit comprising MOS (Metal-Oxide Semiconductor) transistors.

Figure 9:
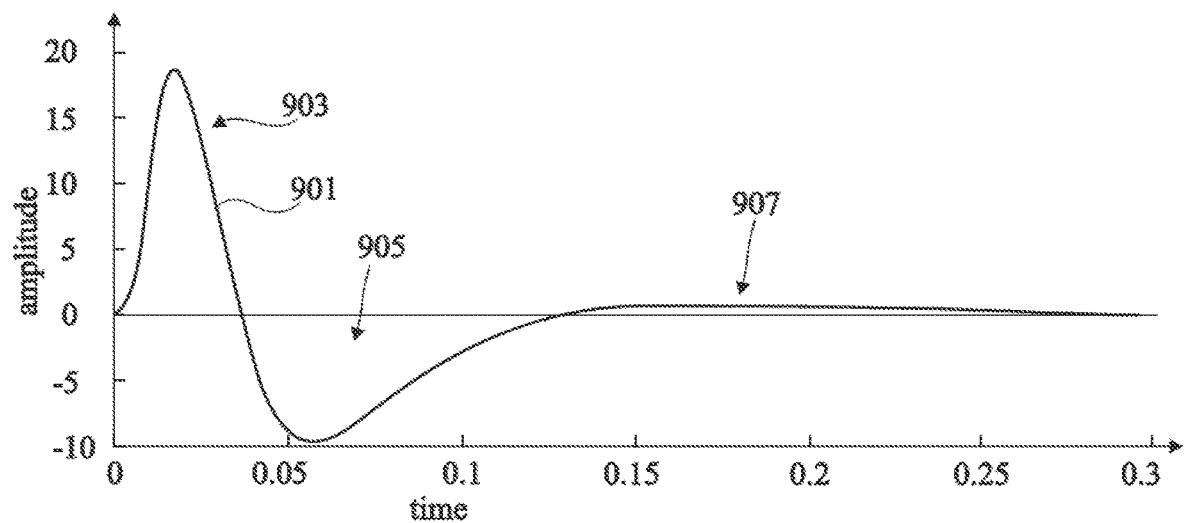
FIG. 9 is a graph illustrating another example of a curve of impulse response of a filter.

FIG. 9 is a graph illustrating another example of a finite response curve 901 of a filter, for example, the filter 201 of the coding unit 101 of FIG. 2. The graph of FIG. 9 more particularly illustrates an example of the time variation of an amplitude of an output signal of filter 201 during the application of an event of limited duration at the input of filter 201. The output signal of filter 201 is for example a voltage signal used to excite the membrane of the neuron 203 of coding unit 101.

The graph of FIG. 9 more particularly illustrates an example where filter 201 is a bandpass filter. In this case, filter 201 is for example intended to eliminate events of the data flow which have a frequency of occurrence located outside of a frequency range, or a duration of occurrence located outside of a duration range, to keep events having their frequency of occurrence located within the frequency range, or their duration of occurrence located within the duration range. As compared with the low-pass filter, this for example enables to discard stationary events capable of adversely affecting the subsequent processing of the data flow. The bandpass filter may also be used to target events having a given duration or frequency of occurrence.

In the shown example, curve 901 has:
a hump 903, for example, reflecting the occurrence of an event;
a depression 905, for example reflecting the disappearing of the event; and
another hump 907, for example reflecting the reappearing of the event.

As an example, filter 201 may in this case be used to detect the disappearing of the event. Filter 201 then for example is a bandpass filter calibrated with respect to the duration corresponding to depression 905. In practice, filter 201 is for example formed by using analog components, for example, by addition and/or subtraction of finite impulse response (FIR) filters, or by using digital components where adequate coefficients are parameterized.

Figure 10:
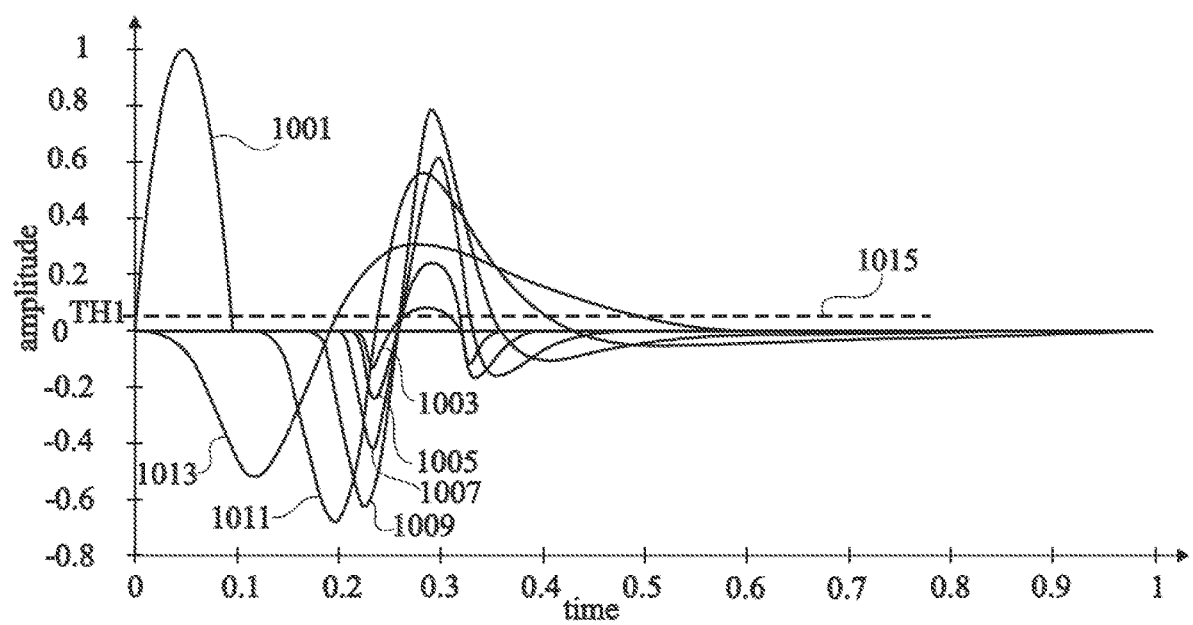
FIG. 10 is a graph illustrating examples of responses of different filters to an input signal.

FIG. 10 is a graph illustrating examples of responses of different filters to an input signal represented by a curve 1001. The graph of FIG. 10 more particularly illustrates, with curves 1003, 1005, 1007, 1009, 1011, and 1013, examples of the time variation of an amplitude of an output signal of filter 201. In this example, it is assumed that filter 201 is a bandpass filter as discussed in relation with FIG. 9.

Conversely to FIG. 9, where the temporary disappearing of an event is desired to be detected, the curves 1003, 1005, 1007, 1009, 1011, and 1013 of FIG. 10 illustrate an example where the temporary occurrence of an event is desired to be detected. The curves 1003, 1005, 1007, 1009, 1011, and 1013 of FIG. 10 have, to within their sign, a shape similar to that of the curve 901 of FIG. 9. In other words, curves 1003, 1005, 1007, 1009, 1011, and 1013 have a shape similar to a curve that would be obtained by vertical symmetry, with respect to the axis of abscissas, of curve 901.

Curves 1003, 1005, 1007, 1009, 1011, and 1013 for example correspond to the output signals of filter 201 obtained as a response to an event having a duration of approximately 0.1 s, symbolized by curve 1001. More particularly, in the shown example, curves 1003, 1005, 1007, 1009, 1011, and 1013 correspond to response signals of filters 201 having time scales respectively equal to 12 ms, 24 ms, 48 ms, 96 ms, 192 ms, and 384 ms. The term time scale more particularly means a duration of a main lobe of a finite impulse response of a filter. In the shown example, the time scale corresponds to the duration of the main lobe of the finite impulse filter at the origin of curve 1003, 1005, 1007, 1009, 1011, 1013 when the associated filter has to react to event 1001.

As an example, curves 1003, 1005, 1007, 1009, 1011, and 1013 are obtained by using a cascade of RC filters, for example, of FIR type. The following equation enables to obtain the finite impulse response $RC_{FIR}$, at a given position n of the cascade of FIR filters, of the filters, curves 1003,

1005, 1007, 1009, 1011, and 1013 illustrating the response of these filters when they receive input signal 1001:

$$RC_{FIR} = \frac{t^{n-1} \times e^{\frac{-t}{uk}}}{n! \times uk^n} \quad \text{[Math 2]}$$

In the above equation Math 2, uk designates a time constant.

In FIG. 10, a horizontal dotted line 1015 symbolizes the turn-on threshold TH1 of neuron 203. In the shown example, curves 1003, 1005, 1007, 1009, 1011, and 1013 all intersect line 1015. In other words, the event symbolized by curve 1001 is detected whatever the selected filter. It may thus be provided to associate, with the neuron 203 of coding unit 101, a filter bank enabling to detect events having a duration extending over a duration range of variable width according, for example, to the number of filters comprised in the bank.

Figure 11:
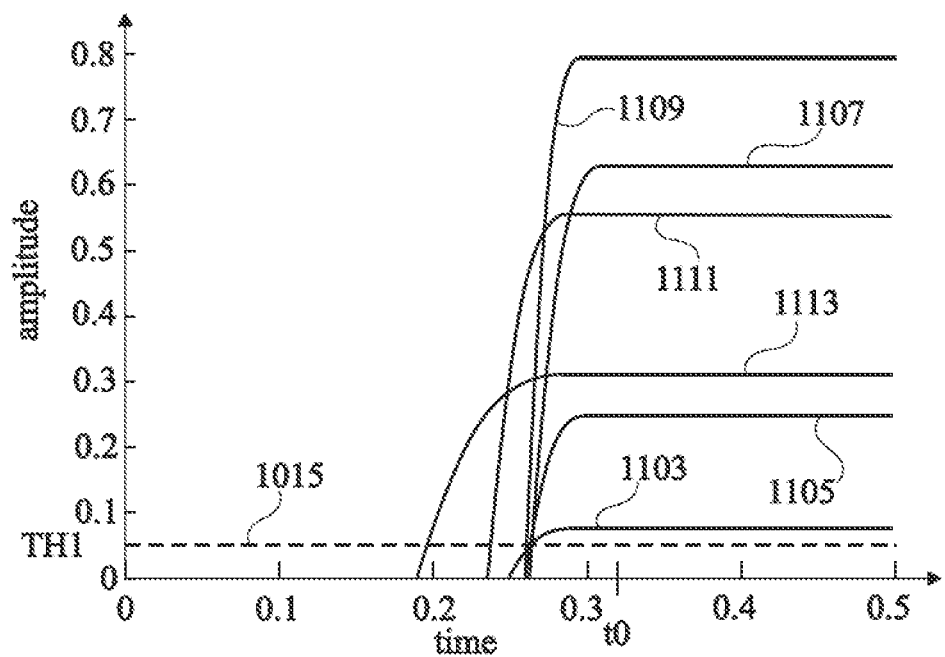
FIG. 11 is a graph illustrating other examples of output signals of different filters.

FIG. 11 is a graph illustrating, with curves 1103, 1105, 1107, 1109, 1111, and 1113, other examples of output signals of different filters. More particularly, 1103, 1105, 1107, 1109, 1111, and 1113 respectively illustrate an example of sampling, by a peak detector, of the signals represented by curves 1003, 1005, 1007, 1009, 1011, and 1013 of FIG. 10.

The sampling by a peak detector for example enables to hold the signals represented by curves 1003, 1005, 1007, 1009, 1011, and 1013 at their maximum value. It may advantageously be provided to delay the emission of the spike by neuron 203 so that this emission for example occurs at an identical time t0 whatever the selected filter.

The peak detector may for example be implemented by a capacitor associated with a diode.

Figure 12:
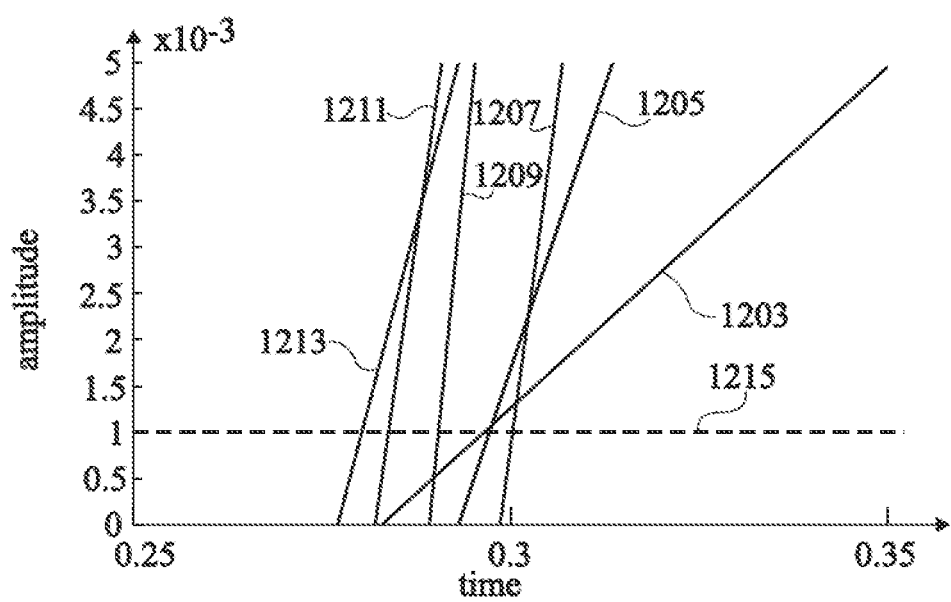
FIG. 12 is a graph illustrating still other examples of signals associated with the operation of the coding unit of FIG. 2.

FIG. 12 is a graph illustrating still other examples of signals associated with the operation of the coding unit 101 of FIG. 2. The graph of FIG. 12 more particularly illustrates, with curves 1203, 1205, 1207, 1209, 1211, and 1213, examples of a time variation of an amplitude of the membrane voltage of neuron 207, stored by sample-and-hold unit 205 at the time of generation of a spike by neuron 203.

In the shown example, curves 1203, 1205, 1207, 1209, 1211, and 1213 more particularly illustrate examples of signals obtained during the integration, by neuron 207, of the membrane voltage of neuron 203. More particularly, curves 1203, 1205, 1207, 1209, 1211, 1213 are for example respectively obtained by integrating the amplitude of the membrane voltage of neuron 203 read, at time t0 of FIG. 11, from the corresponding curve 1003, 1005, 1007, 1009, 1011, 1013.

In FIG. 12, a horizontal dotted line 1215 symbolizes the turn-on threshold TH2 of neuron 207. In the shown example, curves 1203, 1205, 1207, 1209, 1211, and 1213 intersect line 1215 at different points. In the shown example, the higher the amplitude of the input signal, the shorter the turn-on delay of threshold TH2, after generation of the spike by neuron 203. More particularly, in the shown example, the delay of crossing of threshold TH2 is inversely proportional to the amplitude of the input signal. This for example corresponds to a case where neuron 207 linearly integrates the membrane voltage of neuron 203. A non-uniform coding is then obtained.

It is however possible, as discussed in relation with FIG. 8, to come down to a uniform coding by applying an appropriate transformation. The adaptation of what has been described in relation with FIG. 8 to the coding described in relation with FIG. 12 is within the abilities of those skilled in the art.

An advantage of the described embodiments lies in the fact that they enable to generate a spike indicating the occurrence of the event, and another spike enabling to code the amplitude of the event. This generates a lower power consumption than for encoders implementing a rate coding. More particularly, the coding of an event by the described embodiments and implementation modes implies the generation of two spikes: one spike, generated by neuron 203, to signal the time of occurrence of the event, and another spike, generated by neuron 207, to code the amplitude of the event.

The spikes that are generated when events are coded by neurons 203 and 207 of coding unit 101 (FIG. 1) form spike patterns, as those for example described in relation with FIG. 5. In the case, for example, of a classification neural network, the spike patterns generated in response to a data flow can be advantageously used to implement learning and inference methods such as described below in relation with embodiments illustrated in FIGS. 15 to 19.

Figure 15:
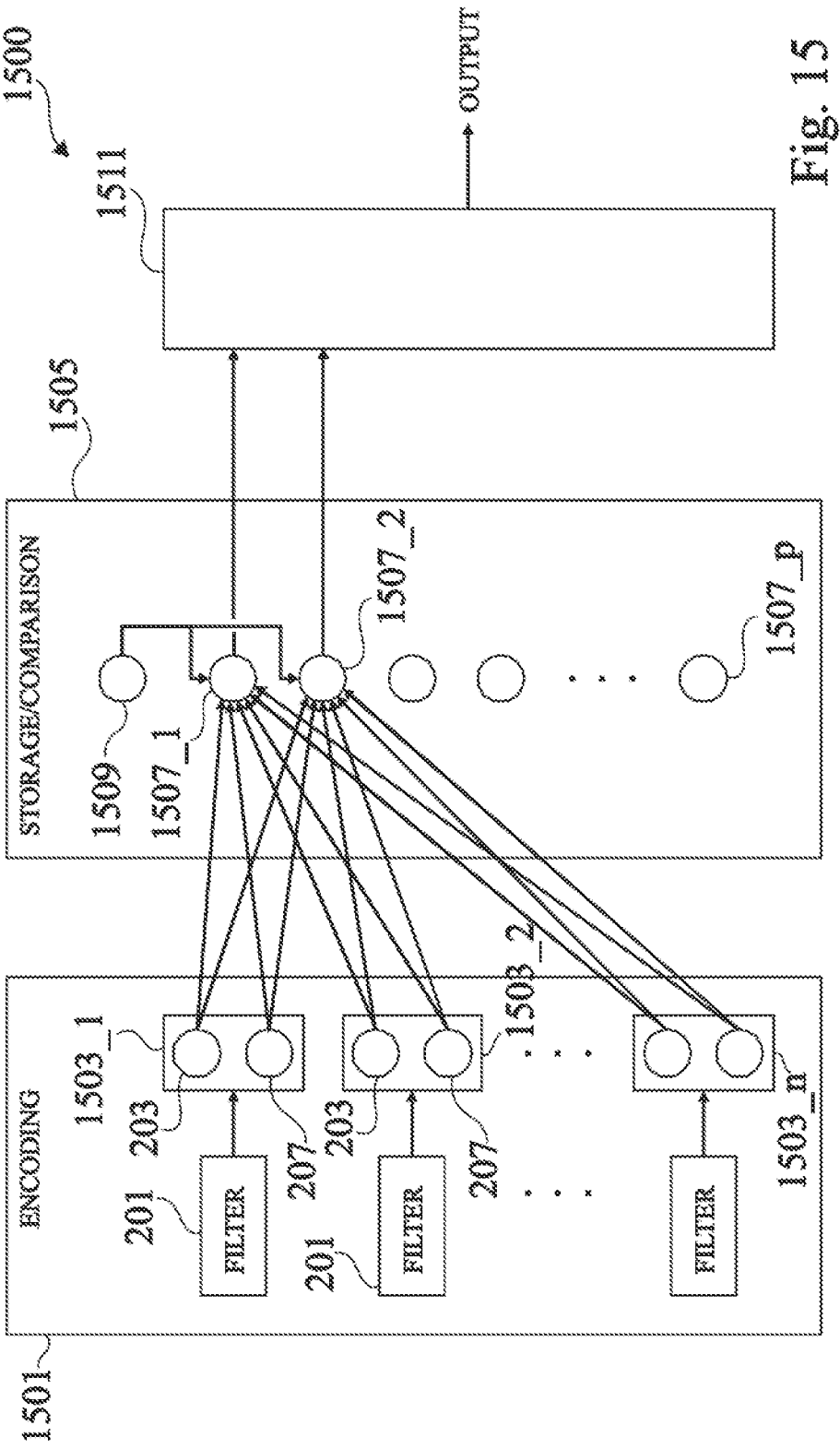
FIG. 15 schematically shows in the form of blocks an embodiment of a neural network.

FIG. 15 schematically shows in the form of blocks an embodiment of a neural network 1500. The neural network is for example implemented by dedicated hardware, in other words by digital circuits, such as an ASIC (Application Specific Integrated Circuit) or FPGA (Field Programmable Gate Array). Alternatively, a software implementation would also be possible, the functions of the neural network being performed, for example, by the circuit 300 of FIG. 3.

Neural network 1500 comprises an encoding layer 1501 (ENCODING) for example similar to coding unit or encoder 101 of FIG. 1. Layer 1501 for example comprises n pairs 1503 (1503_1, 1503_2, . . . 1503_n) of spiking neurons 203 and 207, n being an integer for example equal to several hundreds. As an example, n corresponds to a number of channels related to an input data flow to be encoded. Each pair 1503 of spiking neurons 203 and 207 is for example associated with the filter 201 (FILTER) as previously described in relation with FIG. 2. For the sake of clarity, the links between filter 201 and spiking neurons 203, 207 are not detailed in FIG. 15.

Neural network 1500 comprises a storage and comparison layer 1505 (STORAGE/COMPARISON). Layer 1505 for example comprises p memorizing or storing neurons 1507 (1507_1, 1507_2, . . . 1507_p), p being an integer for example equal to several thousands. For example, p is equal to a number of signal patterns, or classes, that the system is capable of recognizing. Each neuron 1507 of layer 1505 is coupled to the spiking neurons 203 and 207 of each pair 1503. As layer 1501 comprises n pairs 1503 of neurons 203 and 207, each neuron 1507 is thus coupled, by 2n synapses, to 2n spiking neurons 203, 207. For the sake of clarity, the links between neurons 1507 and neurons 203, 207 of pairs 1503 are only partially illustrated in FIG. 15.

As represented, layer 1505 may comprise a timing neuron 1509. Neuron 1509 is connected to all neurons 1507 of layer 1505. Neuron 1509 is for example configured to initiate and to terminate a period AP, herein called "attention period", during which neurons 1507 of layer 1505 are able to record spikes that they receive from neurons 203 and 207 of layer 1501. The attention period AP begins for example when neuron 1509 transmits an enable signal to neurons 1507, and ends when neuron 1509 stops transmitting the enable signal.

Neural network 1500 comprises an output selection block 1511, which is coupled or connected to all neurons 1507 of layer 1505 (for the sake of clarity, only some of the connections between neurons 1507 and block 1511 are illustrated in FIG. 15). Block 1511 is for example adapted to compare signals or values provided by neurons 1507, and to output a selected signal or value (OUTPUT) corresponding to a result of the comparison.

Figure 16:
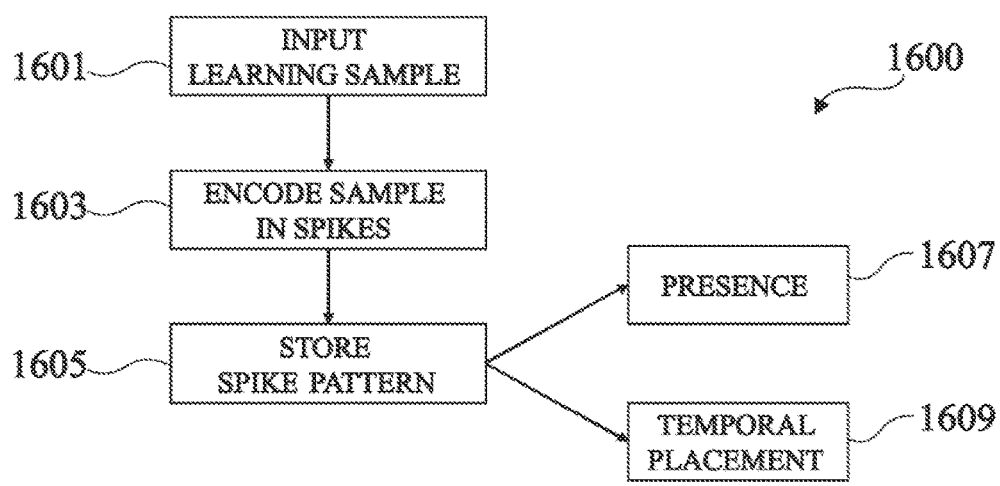
FIG. 16 is a flow diagram illustrating operations in a learning method.

FIG. 16 is a flow diagram 1600 illustrating operations in a learning method. The operations described below in relation with FIG. 16 may for example be executed by neural network 1500 based on spike patterns that are generated by layer 1501 in response to a data flow.

At a first step 1601 (INPUT LEARNING SAMPLE) of the flow diagram 1600, layer 1501 for example receives a data flow corresponding to an image or a sound sample, which will be called herein a "learning sample". The learning sample is for example intended to train neural network 1500 to recognize images or sounds.

At a further step 1603 (ENCODE SAMPLE IN SPIKES), layer 1501 encodes the learning sample in spikes. As described above, the encoding for example results in a spike pattern, represented by spike pattern data, associated with the learning sample. The spike pattern data for example comprise:

data, which will be called herein "spike presence" $Sp_k$, indicating that a spike has been emitted, or not, by each spiking neuron 203, 207 of each pair 1503; and other data, which will be called herein "temporal placement" Stk, that indicates the timing of the spikes, in other words the time of appearance, of each of the spikes transmitted by at least some spiking neurons 203 and 207, during the attention period AP.

Spike presence $Sp_k$ is for example a binary parameter having a first value (for example "0") if the neuron 203, 207 connected to the $k^{th}$ synapse of neuron 1503 does not emit a spike, and a second value ("1", in this example) in the opposite case.

The attention period AP is for example generated using a countdown timer. The spike temporal placement Stk for example corresponds to the value of the countdown timer at the time when the spike emitted by neuron 203, 207 hits the $k^{th}$ synapse of neuron 1503. In a spike pattern, there are as many parameters $Sp_k$ as synapses connected to each neuron 1507, that is 2n synapses in the neural network 1500 of FIG. 15. There are also as many parameters Stk as synapses connected to each neuron 1507. A spike pattern for example corresponds to a set of 2n parameters $Sp_k$ and 2n parameters Stk. The parameters $Sp_k$ and Stk are for example temporarily stored in a volatile memory of neuron 1507.

At a further step 1605 (STORE SPIKE PATTERN), the spike pattern resulting from the encoding of the learning sample is stored to memory, for example using layer 1505 of the neural network 1500. The parameters $Sp_k$ (block 1607, PRESENCE) and Stk (block 1609, TEMPORAL PLACEMENT) are for example recorded, by one of the neurons 1507, for each of the 2n synapses of this neuron. The parameters $Sp_k$ and Stk that have been recorded by a neuron 1507, also called reference parameters, will be hereinafter referenced $Sw_k$ and $Sd_k$. The reference parameters $Sw_k$ and $Sd_k$ are for example stored in a non-volatile memory of neuron 1507.

When executing the learning method, the successive operations of the flow diagram 1600 can be, for example, repeated for a plurality of learning samples of a database, and in some cases for each learning sample of the database. This results in storing spike pattern data corresponding to some or all learning samples of the database.

Figure 17:
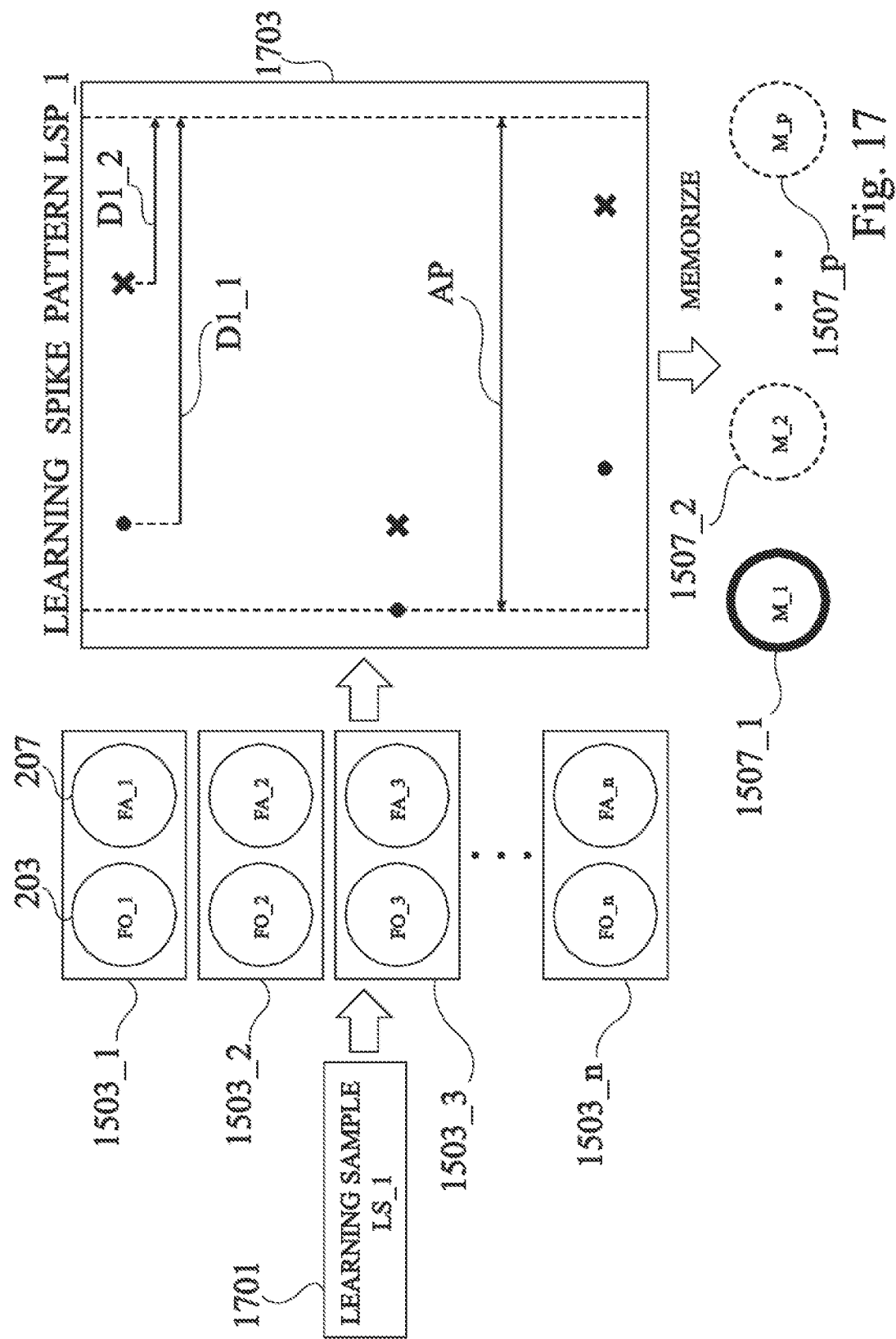
FIG. 17 schematically shows an example of implementation of the learning method of FIG. 16.

FIG. 17 schematically shows an example of implementation of the learning method of FIG. 16.

An image or sound sample LS_1 (block 1701, LEARNING SAMPLE LS_1), for example the first learning sample of the database, is encoded by neural network 1500, for example by implementing the steps of the above-described learning method. As described above, neural network 1500 comprises n pairs 1503 (1503_1, 1503_2, 1503_3, . . . 1503_n) of spiking neurons 203 (FO_1, FO_2, FO_3, . . . FO_n) and 207 (FA_1, FA_2, FA_3, . . . FA_n). After encoding sample LS_1 by neural network 1500, a spike pattern LSP_1 (block 1703, LEARNING SPIKE PATTERN LSP_1) associated with sample LS_1 is obtained.

In the example illustrated in FIG. 17, the spike pattern LSP_1 comprises data, schematically represented by dots and crosses, corresponding to the spikes transmitted by neurons 203 and 207, respectively, of the pairs 1503_1, 1503_3 and 1503_n. Depending on the input data flow, some of the pairs 1503 of spiking neurons 203 and 207 may transmit no spike, as illustrated in FIG. 17 for pair 1503_2. The recorded values of the parameters $Sw_k$ related to neurons 203 and 207 of pair 1503_2 are for example equal to 0, whereas the parameters $Sw_k$ related to neurons 203 and 207 of pairs 1503_1, 1503_3 and 1503_n are for example equal to 1.

The temporal placement $Sd_k$ of each spike for example corresponds to a time duration separating the spike time of appearance from the end of the attention period AP. As illustrated in FIG. 17, a duration D1_1 separates the instant when a spike is transmitted by spiking neuron 203 of pair 1503_1 from the end of the attention period AP. In a similar manner, a duration D1_2 separates the instant when a spike is transmitted by spiking neuron 207 of pair 1503_1 from the end of the attention period AP. Durations D1_1 and D1_2 for example correspond to the parameters $Sd_k$ related to the neurons 203 and 207 of pair 1503_1, respectively.

Spike pattern LSP_1, that is the sets of parameters $Sp_k$ and Stk associated with sample LS_1, is stored, as a set of parameters $Sw_k$ and $Sd_k$, by one of the p memorizing neurons 1507_1 (M_1), 1507_2 (M_2), . . . 1507_p (M_p) of layer 1505, for example by neuron 1507_1.

In the illustrated example, neuron 1507_1 stores, or learns, the spike pattern LSP_1. For example, the spike pattern is stored as a reference spike pattern data. Furthermore, a sample label (not shown) corresponding to sample SP_1 is for example assigned to neuron 1507_1. Each of the memorizing neurons 1507_1, 1507_2, . . . 1507_p is for example initially available for storing a spike pattern. When the learning method is executed, the memorizing neurons progressively store reference spike patterns data and their associated labels, thus causing these neurons to become "trained". As an example, neuron 1507_1 has been trained (this is illustrated in FIG. 17 by a thick solid circle), meaning a spike pattern and its associated label has already been stored by neuron 1507_1, whereas the other neurons 1607_2, . . . 1607_p are available for memorizing a spike pattern, meaning they do not store data corresponding to a spike pattern (this is illustrated in FIG. 17 by thin dashed circles).

In the example of FIG. 17, the attention period is initiated by the appearance of the first spike that is transmitted by layer 1501 to layer 1505. Alternatively, the beginning of the attention period can be triggered by neuron 1509 as described previously.

The number p of neurons 1507 is for example equal to or superior than a number of spike patterns to be stored.

Figure 18:
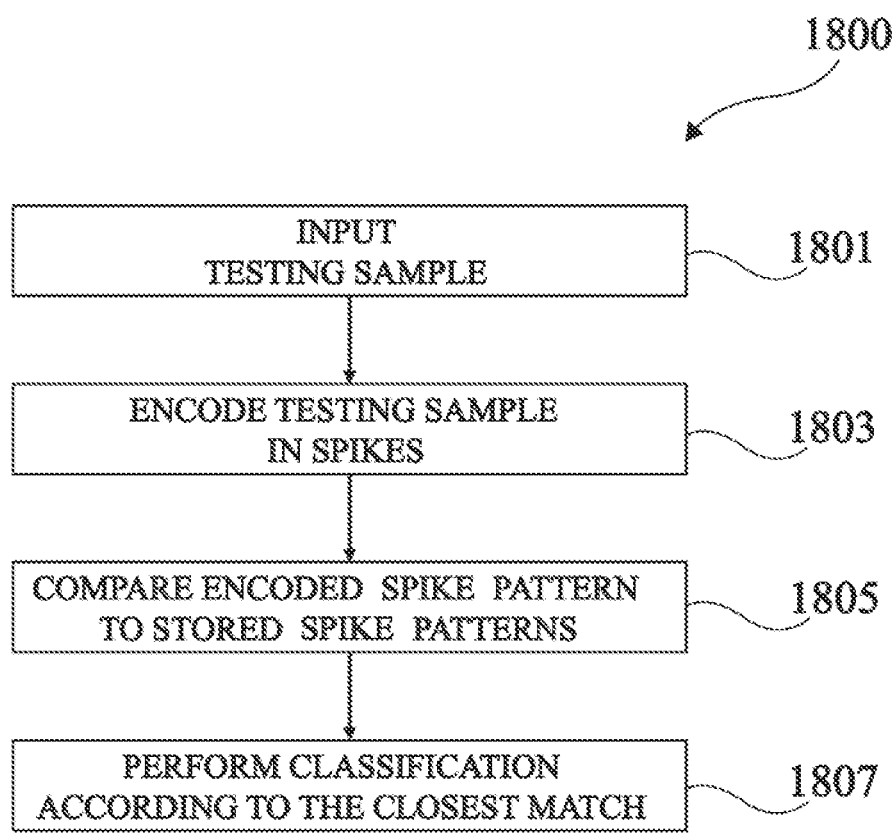
FIG. 18 is a flow diagram illustrating operations in an inference method.

FIG. 18 is a flow diagram 1800 illustrating operations in an inference method. The operations described below in relation with FIG. 18 may for example be executed by neural network 1500 based on spikes that are transmitted from layer 1501 in response to a data flow. As an example, the data flow processed by neural network 1500 during the execution of the inference method originates from images or sounds that are intended to test image or voice recognition features of the neural network 1500.

At a first step 1801 (INPUT TESTING SAMPLE) of the flow diagram 1800, layer 1501 for example receives a data flow corresponding to an image or a sound sample, which will be called herein a "testing sample". The testing sample is for example intended to evaluate whether neural network 1500 is able to recognize images or sounds.

At a further step 1803 (ENCODE TESTING SAMPLE IN SPIKES), layer 1501 encodes the testing sample in spikes. As described above, the encoding results in generating a spike pattern associated with the testing sample.

At a further step 1805 (COMPARE ENCODED SPIKE PATTERN TO STORED SPIKE PATTERNS), the spike pattern resulting from the encoding of the testing sample is compared to the reference spike patterns that have been stored after execution of the learning method. Spike presences $Sp_k$ and temporal positions Stk are generated in the same way as during the learning method, except that, rather than being stored as reference data, they are only temporarily stored in order to allow comparison with the reference data.

At the end of the attention period, each neuron 1507 for example compares the spike pattern corresponding to the testing sample, that is the set of parameters $Sp_k$ and Stk, with the reference spike pattern data, that is the set of parameters $Sw_k$ and $Sd_k$, it has previously stored. The comparison for example comprises:

- checking whether spikes, which are present in the spike pattern of the learning sample that has been previously stored by neuron 1507 during learning, are also present in the spike pattern of the testing sample; and
- performing distance calculations aiming to evaluate timing differences between the spikes of the testing sample and the corresponding spikes of the stored learning sample.

As an example, the distance calculations are performed according to the following equation:

As an example, the distance calculations are performed according to the following equation:

$$\text{DISTANCE} = \sum_{synapse\ k=1}^{all\ synapses} (St_k - Sd_{k|Sp_k})^2 + Aena_{|Sw_k=1 \cap Sp_k=0} \quad [\text{Math 3}]$$

In the equation Math 3, Aena is a parameter corresponding to a distance penalty that is applied if a spike is expected ($Sw_k=1$) but not received ($Sp_k=0$). As an example, the learning and inference methods are performed using several values of the Aena parameter, and the value providing the best performance is conserved.

During inference, the following operations are for example implemented by each neuron 1507:

- if an expected spike ($Sw_k=1$) occurs ($Sp_k=1$), then the squared timing difference $(Stk-Sd_k)2$ is added to the DISTANCE sum;
- if a spike that was not expected ($Sw_k=0$) occurs ($Sp_k=1$), then $(Stk)2$ is added to the DISTANCE sum;
- if an expected spike ($Sw_k=1$) does not occur ($Sp_k=0$), then the Aena distance penalty is added to the DISTANCE sum; and
- if a spike that was not expected ($Sw_k=0$) does not occur ($Sp_k=0$), the DISTANCE sum is left unchanged.

At a further step 1807 (PERFORM CLASSIFICATION ACCORDING TO THE CLOSEST MATCH), block 1511 compares the DISTANCE sums calculated by all previously trained neurons 1507 and determines which one of these neurons 1507 has the smallest DISTANCE sum value. The OUTPUT signal or data then reflects the label of the neuron 1507 that has the smallest DISTANCE sum value, thus performing classification.

Alternatively, block 1511 can be implemented as a "winner-takes-all" function. In such a case, the neurons 1507 are for example each configured to emit a spike after a time delay that is proportional to its calculated DISTANCE sum value. The block 1511 is for example configured to select the output of the first of the neurons 1507 to emit a spike, and to then inhibit spike emissions from these other neurons. Knowing which one of the neurons 1507 emits a spike then allows to determinate the associated label and to perform the classification.

Figure 19:
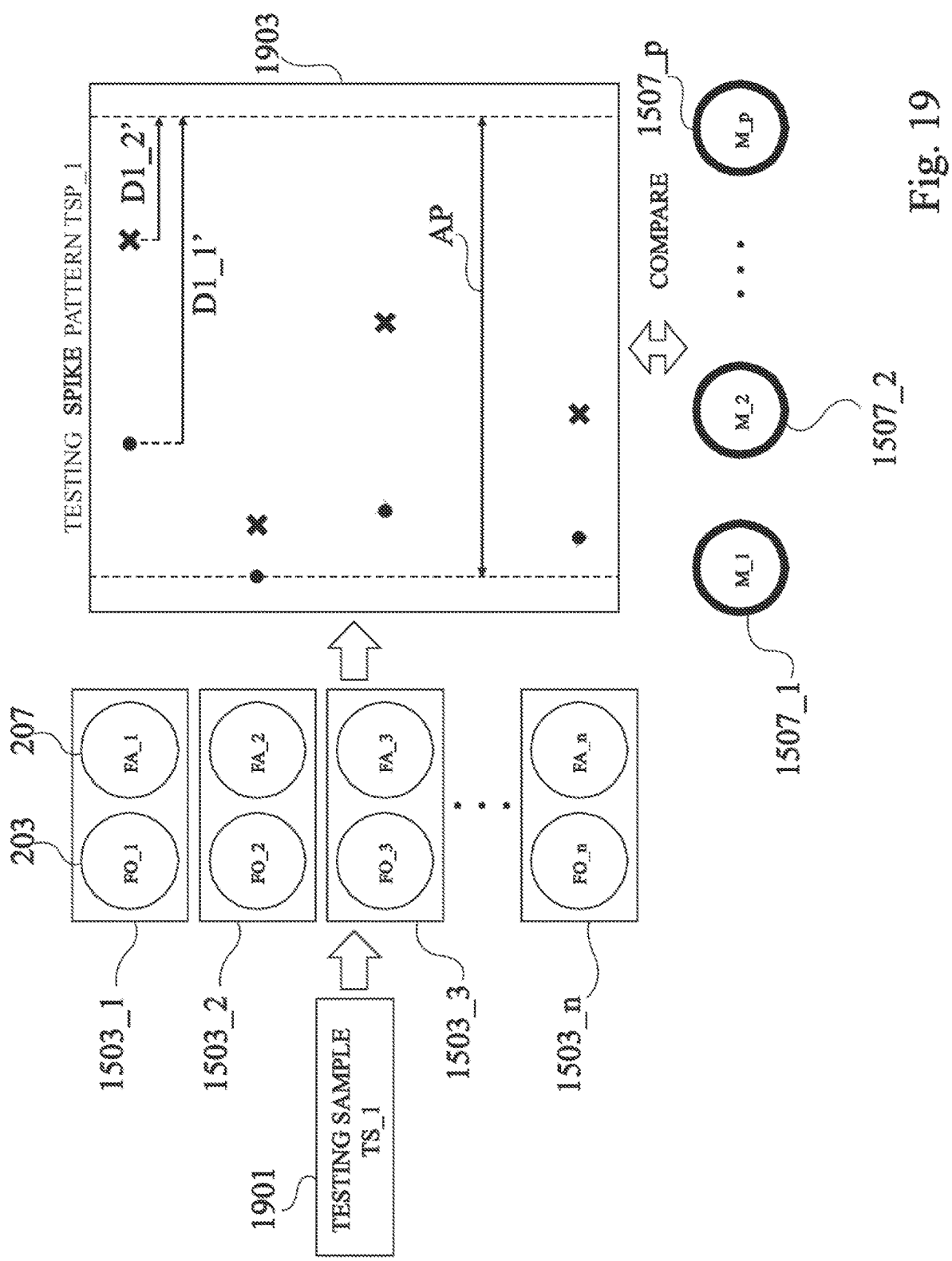
FIG. 19 schematically shows an example of implementation of the inference method of FIG. 18.

FIG. 19 schematically shows an example of implementation of the inference method of FIG. 18.

An image or sound sample TS_1 (block 1901, TESTING SAMPLE TS_1) is encoded by neural network 1500, for example by implementing the steps of the above-described inference method. After encoding sample TS_1 by neural network 1500, a spike pattern TSP_1 (block 1903, TESTING SPIKE PATTERN TSP_1), associated with sample TS_1, is obtained.

In the example illustrated in FIG. 19, the spike pattern TSP_1 comprises data, schematically represented by dots and crosses, corresponding to the spikes transmitted by neurons 203 and 207, respectively, of the pairs 1503_1, 1503_2, 1503_3 and 1503_n.

As illustrated in FIG. 19, a duration D1_1' separates the instant when a spike is transmitted by spiking neuron 203 of pair 1503_1 from the end of the attention period AP, and a duration D1_2' separates the instant when a spike is transmitted by spiking neuron 207 of pair 1503_1 from the end of the attention period AP. Durations D1_1 and D1_2 for example correspond to the parameters $Sd_k$ related to the neurons 203 and 207 of pair 1503_1, respectively.

Testing spike pattern TSP_1 differs from learning spike pattern LSP_1 that has previously been stored in neuron 1503_1. In the illustrated example, spike pattern TSP_1 comprises spikes corresponding to the neurons 203 and 207 of pair 1503_2, whereas it was not the case for spike pattern LSP_1. Moreover, distances D1_1' and D1_2' differ from distances D1_1 and D1_2. As a result, neural network 1500 may in such a case conclude that testing sample TS_1 does not match the features of learning sample LS_1 and find a better match among the spike patterns that have been stored by the other neurons 1503_2, 1503_3, . . . 1503_n.

Various example embodiments are summarized below, with example references to the figures.

An embodiment provides a data flow coding method (400) comprising:

- the receiving (405), by a first spiking neuron, of the data flow;
- the transmitting (409), from the first spiking neuron to a second spiking neuron (407), of an event detection signal indicating a time of detection of an event of the data flow; and
- the generation (417), by means of the second spiking neuron, of a coded signal, the coded signal comprising a spike delayed, with respect to the time of detection of the event, according to an amplitude of the event.

According to an embodiment, prior to the reception (405) of the data flow by the first spiking neuron, the data flow is filtered (403).

According to an embodiment, the filtering (403) of the data flow keeps events which have a duration longer than a first duration threshold.

According to an embodiment, the filtering (403) of the data flow keeps events which have a duration comprised within a duration range.

According to an embodiment, the coded signal comprises a first spike, at the time of detection of the event, and the delayed spike.

According to an embodiment, the data flow corresponds to an analog audio signal.

An embodiment provides a data flow coding unit (101), configured to implement the method such as described.

According to an embodiment, the unit (101) comprises a first spiking neuron circuit (203) configured to receive the data flow and to transmit, to a second spiking neuron circuit (207), an event detection signal indicating a time of detection of an event of the data flow, the second spiking neuron being configured to generate a coded signal comprising a spike delayed, with respect to the time of detection of the event, according to an amplitude of the event.

According to an embodiment, the unit further comprises a sample-and-hold circuit (205) configured to store the amplitude of the event at the time of the transmission, by the first neuron (203), of the event detection signal to the second neuron (207).

An embodiment provides a system (100) comprising:
a coding unit (101) such as described; and
a neural network (103), intended to process coded signals originating from the coding unit.

In an embodiment, a method comprises storing (1605), by a neuron (1503) of a neural network, spike pattern data (LSP_1, TSP_1) originating from the coding of an event (LS_1, TS_1), the spike pattern data comprising a set:
of first parameters ($Sp_k$), indicating the presence of spikes on synapses of the neuron; and
of second parameters (Stk), indicating a timing of the spikes.

According to one embodiment, the method further comprises storing (1605), by the neuron (1503), the first ($Sp_k$) and second (Stk) parameters of the spike pattern data as corresponding first ($Sw_k$) and second ($Sd_k$) reference parameters.

According to one embodiment, the first ($Sw_k$) and second ($Sd_k$) reference parameters are stored in a non-volatile memory.

According to one embodiment, the method further comprises comparing (1805) the first ($Sp_k$) and second (Stk) parameters of the spike pattern data (TSP_1) with corresponding first ($Sw_k$) and second ($Sd_k$) parameters of reference spike pattern data (LSP_1).

According to one embodiment, the first ($Sp_k$) and second (Stk) parameters of the spike pattern data (TSP_1) are stored in a volatile memory and the first ($Sw_k$) and second ($Sd_k$) reference parameters are stored in a non-volatile memory.

According to one embodiment, the comparison (1805) is performed by a distance calculation.

In an embodiment, a method comprises: generating, by a first spiking neuron, an event detection signal indicating a time of detection of an event in a data flow; transmitting, from the first spiking neuron to a second spiking neuron, the event detection signal; and generating, by the second spiking neuron, of a spike delayed, with respect to the time of detection of the event, according to an amplitude of the event, the delayed spike being included in a coded signal. In an embodiment, the method comprises filtering the data flow provided to the first spiking neuron. In an embodiment, the filtering of the data flow filters events based on a first duration threshold. In an embodiment, events with a duration equal to or below the first duration threshold are filtered from the data flow. In an embodiment, the filtering of the data flow filters events based on a duration range. In an embodiment, events outside the duration range are filtered from the data flow. In an embodiment, the coded signal comprises a first spike, at the time of detection of the event, and the delayed spike. In an embodiment, the data flow corresponds to an analog audio signal, or an analog video signal.

In an embodiment, a device comprises: a first spiking neuron, which, in operation, generates an event detection signal indicating a time of detection of an event in a data flow; and a second spiking neuron coupled to the first spiking neuron, wherein the second spiking neuron, in operation, generates a spike delayed, with respect to the time of detection of the event, according to an amplitude of the event, and the delayed spike is included in a coded signal. In an embodiment, the device comprises a filter, which, in operation, filters the data flow. In an embodiment, the filter filters events based on one or more duration thresholds. In an embodiment, the one or more duration thresholds define a threshold range. In an embodiment, the event detection signal is an event spike and the coded signal includes the event spike and the delayed spike. In an embodiment, the data flow corresponds to an analog audio signal or an analog video signal. In an embodiment, the device comprises a sample-and-hold circuit, which, in operation, stores an amplitude of the event in the data flow. In an embodiment, the second spiking neuron, in operation, integrates a membrane voltage of the first spiking neuron. In an embodiment, the integrating is non-linear.

In an embodiment, a system comprises: an encoder including: a first spiking neuron, which, in operation, generates a spike indicating a time of detection of an event in a data flow; and a second spiking neuron coupled to the first spiking neuron, wherein the second spiking neuron, in operation, generates a spike delayed, with respect to the time of detection of the event, according to an amplitude of the event, wherein the encoder, in operation, generates a coded signal including the spike indicating detection of the event and the delayed spike; and a neural network coupled to the encoder, wherein the neural network, in operation, processes coded signals generated by the encoder. In an embodiment, the encoder comprises a plurality of pairs of first and second spiking neurons, wherein the encoder, in operation, synchronizes spikes generated by the first spiking neurons of the plurality of pairs of first and second spiking neurons. In an embodiment, the synchronizing includes responding to a firing of a first spiking neuron of one of the plurality of pairs of first and second spiking neurons by adjusting a turn-on threshold of a first spiking neuron of another pair of the plurality of pairs of first and second spiking neurons.

In an embodiment, a method comprises: storing, on a set of storage neurons of a neural network, a set of spike pattern data, the storing the set of spike pattern data including: storing first parameters indicative of a presence of spikes on a respective neuron of the set of storage neurons; and storing, on the set of storage neurons of the neural network, second parameters indicative of a timing of spikes on the respective neuron of the set of storage neurons. In an embodiment, the method comprises storing, by the neurons of the set of storage neurons: the first parameters as corresponding first reference parameters; and the second parameters as corresponding second reference parameters. In an embodiment, the first and second reference parameters are stored in a non-volatile memory. In an embodiment, the method comprises comparing the first and second parameters of the set of spike pattern data with corresponding first and second parameters of a set of reference spike pattern data. In an embodiment, the set of spike pattern data is stored in a volatile memory and the set of reference spike pattern data is stored in a non-volatile memory. In an embodiment, the comparing includes performing a distance calculation.

In an embodiment, a neural network comprises: a timing neuron, which, in operation, generates a signal indicative of an attention period; and a set of storage neurons coupled to the timing neuron, wherein the set of storage neurons, in operation, store a set of spike pattern data, the set of spike pattern data including: first parameters indicative of a presence of spikes on a respective neuron of the set of storage neurons during the attention period; and second parameters indicative of a timing of spikes on the respective neuron of the set of storage neurons. In an embodiment, the neurons of the set of storage neurons, in operation, store: the first parameters as corresponding first reference parameters; and the second parameters as corresponding second reference parameters. In an embodiment, the neural network comprises a non-volatile memory, wherein neurons of the set of storage neurons, in operation, store the first and second reference parameters in the non-volatile memory. In an embodiment, the neurons of the set of storage neurons, in operation, compare first and second parameters of the set of spike pattern data with corresponding first and second parameters of a set of reference spike pattern data. In an embodiment, the neural network comprises a non-volatile memory, wherein the set of reference spike pattern data is stored in the non-volatile memory. In an embodiment, the comparing includes performing a distance calculation.

In an embodiment, a system comprises: an encoder, which, in operation, generates encoded data based on a data flow, the encoder including a plurality of sets of pairs of spiking neurons, each pair including: a first spiking neuron, which, in operation, generates a spike indicating a time of detection of an event in the data flow; and a second spiking neuron coupled to the first spiking neuron, wherein the second spiking neuron, in operation, generates a spike delayed, with respect to the time of detection of the event, according to an amplitude of the event; and a neural network coupled to the encoder, wherein the neural network, in operation, processes coded signals generated by the encoder, and the neural network includes: a timing neuron, which, in operation, generates a signal indicative of an attention period; and a set of storage neurons coupled to the timing neuron, wherein the set of storage neurons, in operation, store a set of spike pattern data based on the encoded data. In an embodiment, the set of spike pattern data includes: first parameters indicative of a presence of spikes on a respective neuron of the set of storage neurons during the attention period; and second parameters indicative of a timing of spikes on the respective neuron of the set of storage neurons. In an embodiment, each storage neuron of the set of storage neurons of the neural network is coupled to the plurality of sets of pairs of spiking neurons of the encoder. In an embodiment, the encoder comprises a filter, which, in operation, filters the data flow. In an embodiment, the neurons of the set of storage neurons, in operation, compare first and second parameters of the set of spike pattern data with corresponding first and second parameters of a set of reference spike pattern data. In an embodiment, the system comprises a support vector machine coupled to the neural network, wherein the support vector machine, in operation, generates a recognition signal based on a score signal generated by the neural network.

Various embodiments, implementation modes, and variations have been described. Those skilled in the art will understand that certain features of these various embodiments, implementation modes, and variants, may be combined and other variants will occur to those skilled in the art. In particular, it will be within the abilities of those skilled in the art to adapt the described embodiments and implementation modes to any type of data flow.

Finally, the practical implementation of the described embodiments and variants is within the abilities of those skilled in the art based on the functional indications given hereabove. In particular, the practical implementation of coding unit 101 is within the abilities of those skilled in the art.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method comprising:
low-pass filtering an analog data flow;

generating, by a first spiking neuron circuit, a first spike indicating a time of detection of an event in the filtered analog data flow;
in response to the generating of the first spike,
activating a sample and hold circuit to hold a value of the event in the filtered analog data flow; and
activating a second spiking neuron circuit coupled to the sample and hold circuit
to generate a spike delayed with respect to the time of detection of the event according to an amplitude of the event by integrating the value of the filtered analog data flow held by the sample and hold circuit, wherein the integrating is non-linear and the delay is an exponential function of the value of the filtered analog data flow held by the sample and hold circuit; and
including the first spike and the delayed spike in a coded signal.

2. The method according to claim 1, wherein the filtering of the analog data flow filters events based on a first duration threshold.

3. The method according to claim 2, wherein events with a duration equal to or below the first duration threshold are filtered from the analog data flow.

4. The method according to claim 1, wherein the filtering of
the analog data flow filters events based on a duration range.

5. The method according to claim 4, wherein events outside the duration range are filtered from the analog data flow.

6. The method according to claim 1, wherein the analog data flow corresponds to an analog audio signal, or an analog video signal.

7. A device comprising:
a filter, which, in operation, low-pass filters an analog data flow; and coding circuitry coupled to the filter, the coding circuitry including:
a first spiking neuron circuit, which, in operation, generates an event detection signal indicating a time of detection of an event in the filtered analog data flow;
a sample and hold circuit, which, in operation, responds to the event detection signal by storing an amplitude of the event in the analog data flow; and
a second spiking neuron circuit coupled to the first spiking neuron circuit and to the sample and hold circuit, wherein the second spiking neuron circuit, in operation, responds to the event detection signal by generating a spike delayed with respect to the time of detection of the event according to an amplitude of the event stored by the sample and hold circuit, wherein,
the second spiking neuron circuit, in operation, generates the delayed spike by applying non-linear integration and the delay is an exponential function of the amplitude of the event stored by the sample and hold circuit, and
the event detection signal is an event spike and the coding circuitry includes the event spike and the delayed spike in a coded signal.

8. The device according to claim 7, wherein the filter filters events based on one or more duration thresholds.

9. The device according to claim 8, wherein the one or more
duration thresholds define a threshold range.

10. The device according to claim 7, wherein the analog data flow corresponds to an analog audio signal or an analog video signal.

11. The device of claim 7, wherein the delay increases as the value of the filtered analog data flow held by the sample and hold circuit increases.

12. The device according to claim 11, wherein the non-linear integrating is a function of a relationship between a trigger threshold of the second spiking neuron circuit and an amplitude of the event stored by the sample and hold circuit.

13. A system, comprising: an encoder including:
a filter, which, in operation, low-pass filters an analog data flow;
a first spiking neuron circuit, which, in operation, generates an event spike indicating a time of detection of an event in the filtered analog data flow;
a sample and hold circuit coupled to the first spiking neuron circuit, wherein the sample and hold circuit, in operation, responds to the event spike of the first neuron spiking circuit by storing a value of the filtered analog data flow; and
a second spiking neuron circuit coupled to the first spiking neuron circuit and to the sample and hold circuit, wherein the second spiking neuron circuit, in operation, responds to
the event spike by generating a spike delayed with respect to the time of detection of the event according to an amplitude of the event, wherein,
the second spiking neuron circuit, in operation, generates the delayed spike by applying non-linear integration to the value stored by the sample and hold circuit, and the delay is an exponential function of the value stored by the sample and hold circuit, and
the encoder, in operation, generates a coded signal including the event spike indicating detection of the event and the delayed spike; and
a neural network coupled to the encoder, wherein the neural network, in operation, processes coded signals generated by the encoder.

14. The system of claim 13, wherein the encoder comprises a plurality of pairs of first and second spiking neuron circuits, wherein the encoder, in operation, synchronizes spikes generated by the first spiking neurons of the plurality of pairs of first and second spiking neuron circuits.

15. The system of claim 14, wherein the synchronizing includes responding to a firing of a first spiking neuron circuit of one of the plurality of pairs of first and second spiking neuron circuits by adjusting a turn-on threshold of a first spiking neuron circuit of another pair of the plurality of pairs of first and second spiking neuron circuits.

16. A non-transitory computer-readable medium having contents which cause processing circuitry to perform a method, the method comprising:
low-pass filtering an analog data flow;
generating, by a first spiking neuron circuit of the processing circuitry, a first spike indicating a time of detection of an event in the filtered analog data flow;
in response to the generation of the first spike,
activating a sample and hold circuit of the processing circuitry to hold a value of the filtered analog data flow; and
activating a second spiking neuron circuit of the processing circuitry to generate a spike delayed with respect to the time of detection of the event according to an amplitude of the event by integrating the value of the filtered analog data flow held by the sample and hold circuit, wherein the integrating is non-linear and the delay is an exponential function of the value of the filtered analog data flow held by the sample and hold circuit; and generating a coded signal including the first spike and the delayed spike.

17. The non-transitory computer-readable medium of claim 16, wherein the contents comprise instructions executable by the processing circuitry.

18. The method of claim 1, wherein the delay is related to the value of the value of the filtered analog data flow held by the sample and hold circuit according to:

$$y = axe^{b \times (x+k)} + cxe^{d \times (x+h)} + f$$

where y represents the delay, x represents the value of the filtered analog data flow held by the sample and hold circuit, and a, b, c, d, f, h, and k are constants.

19. The method of claim 1, wherein the delay increases as the value of the filtered analog data flow held by the sample and hold circuit increases.

20. The device of claim 7, wherein the delay is related to the amplitude of the event stored by the sample and hold circuit according to:

$$y = axe^{b \times (x+k)} + cxe^{d \times (x+h)} + f$$

where y represents the delay, x represents the amplitude of the event stored by the sample and hold circuit, and a, b, c, d, f, h, and k are constants.

* * * * *

UNITED STATES PATENT AND TRADEMARK OFFICE
CERTIFICATE OF CORRECTION

| | | |
|---|---|---|
| PATENT NO. | : 12,373,674 B2 | Page 1 of 1 |
| APPLICATION NO. | : 17/347374 | |
| DATED | : July 29, 2025 | |
| INVENTOR(S) | : Valerian Cincon et al. | |

It is certified that error appears in the above-identified patent and that said Letters Patent is hereby corrected as shown below:

In the Claims

<u>Column 27, Claim 18, Line 12:</u>
"the value of the value of the filtered analog"
Should read:
--the value of the filtered analog--.

Signed and Sealed this
Twenty-third Day of September, 2025

John A. Squires
*Director of the United States Patent and Trademark Office*